(12) United States Patent
Umemura

(10) Patent No.: US 11,399,170 B2
(45) Date of Patent: Jul. 26, 2022

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Naoki Umemura, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 120 days.

(21) Appl. No.: 16/691,433

(22) Filed: Nov. 21, 2019

(65) Prior Publication Data

US 2020/0169713 A1 May 28, 2020

(30) Foreign Application Priority Data

Nov. 27, 2018 (JP) .............................. JP2018-220906

(51) Int. Cl.
*H04N 13/117* (2018.01)
*H04N 13/279* (2018.01)
*H04N 13/282* (2018.01)

(52) U.S. Cl.
CPC ......... *H04N 13/117* (2018.05); *H04N 13/279* (2018.05); *H04N 13/282* (2018.05)

(58) Field of Classification Search
None
See application file for complete search history.

(56) References Cited

U.S. PATENT DOCUMENTS

| 2009/0129630 | A1* | 5/2009 | Gloudemans | G06T 15/20 382/103 |
| 2017/0078646 | A1* | 3/2017 | Matsunobu | H04N 5/247 |
| 2018/0302610 | A1* | 10/2018 | Masuda | H04N 13/117 |
| 2021/0044793 | A1* | 2/2021 | Yoshikawa | H04N 13/279 |

FOREIGN PATENT DOCUMENTS

JP 2015-187797 A 10/2015

* cited by examiner

*Primary Examiner* — James M Anderson, II
(74) *Attorney, Agent, or Firm* — Canon U.S.A., Inc. IP Division

(57) ABSTRACT

An image processing apparatus includes data acquisition units configured to acquire data that is based on first image capturing from a plurality of directions, and on second image capturing from a plurality of directions, a modification unit configured to modify at least one of position information and time information about the data acquired by the second data acquisition unit in association with at least one of position information and time information about the data acquired by the first data acquisition unit, and a generation unit configured to generate a virtual viewpoint image that contains an image of an object captured in the first image capturing and an image of an object captured in the second image capturing, based on the data acquired by the first data acquisition unit, the data acquired by the second data acquisition unit, and the information modified by the modification unit.

23 Claims, 12 Drawing Sheets

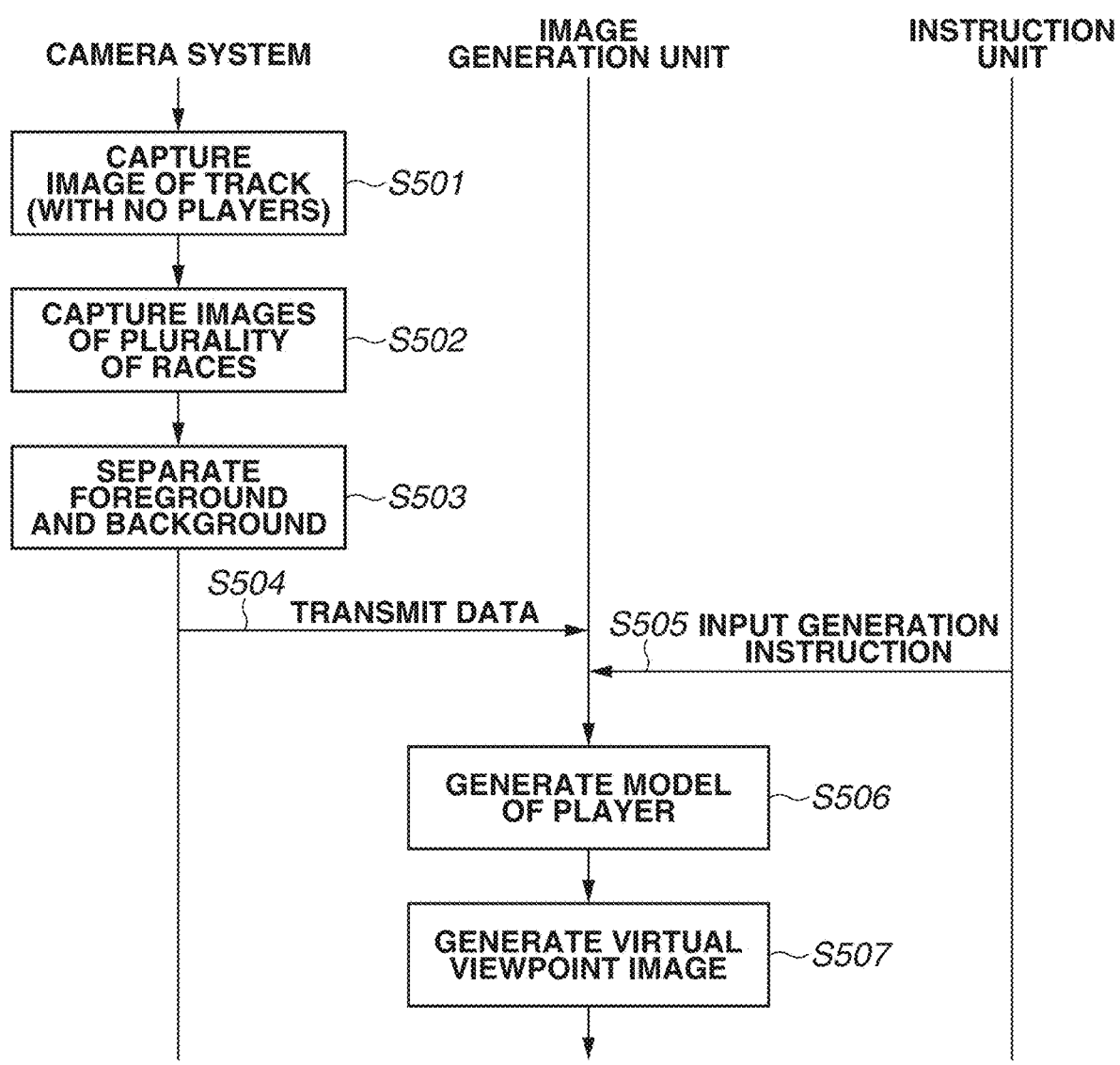

IMAGE PROCESSING APPARATUS, IMAGE PROCESSING METHOD, AND STORAGE MEDIUM

BACKGROUND

Field of the Disclosure

The present disclosure relates to a virtual viewpoint image generated based on a plurality of images acquired using a plurality of image capturing apparatuses.

Description of the Related Art

There is a technique for generating a virtual viewpoint image with a freely-changeable viewpoint using a plurality of images captured synchronously from multi-viewpoints using a plurality of image capturing apparatuses (cameras) provided at different positions. For example, a virtual viewpoint image based on a user-set viewpoint is generated based on a plurality of captured images of a game of sports, such as soccer or basketball, so that a user can view the game from various angles. Such a virtual viewpoint image provides a viewer with various viewing experiences compared to a case of displaying normal captured images.

Japanese Patent Application Laid-Open No. 2015-187797 discusses a technique in which information about a plurality of recommended viewpoints is added as metadata to a virtual viewpoint image so that the virtual viewpoint image can be reproduced while switching the recommended viewpoints with ease.

With the conventional virtual viewpoint images, however, it has not been easy to compare a plurality of image capturing targets that differs in at least one of an image capturing location and an image capturing time point. For example, in a case of capturing a 100-meter dash of a track and field event and generating a virtual viewpoint image, a user may desire to compare how a specific player runs in a preliminary game and in a final game. In this case, if the virtual viewpoint images of the preliminary game and the final game are separately displayed and a virtual viewpoint is set to each of the virtual viewpoint images, the users have difficulty in comparing the displayed images and a virtual viewpoint control operation becomes complicated, which is inconvenient to the user.

SUMMARY

According to an aspect of the present disclosure, an image processing apparatus includes a first data acquisition unit configured to acquire data that is based on first image capturing from a plurality of directions, a second data acquisition unit configured to acquire data that is based on second image capturing from a plurality of directions, wherein the first image capturing and the second image capturing are different in at least one of an image capturing location and an image capturing time point, a modification unit configured to modify at least one of position information and time information about the data acquired by the second data acquisition unit in association with at least one of position information and time information about the data acquired by the first data acquisition unit, a viewpoint acquisition unit configured to acquire viewpoint information specifying a position and a direction of a virtual viewpoint, and a generation unit configured to generate a virtual viewpoint image that corresponds to the viewpoint information acquired by the viewpoint acquisition unit and contains an image of an object captured in the first image capturing and an image of an object captured in the second image capturing, based on the data acquired by the first data acquisition unit, the data acquired by the second data acquisition unit, and the information modified by the modification unit.

Further features of the present disclosure will become apparent from the following description of exemplary embodiments with reference to the attached drawings.

BRIEF DESCRIPTION OF THE DRAWINGS

FIG. 4 is a sequence diagram illustrating an example of an operation of the image processing system.

DESCRIPTION OF THE EMBODIMENTS

[Configuration of Image Processing System]

Figure 1:
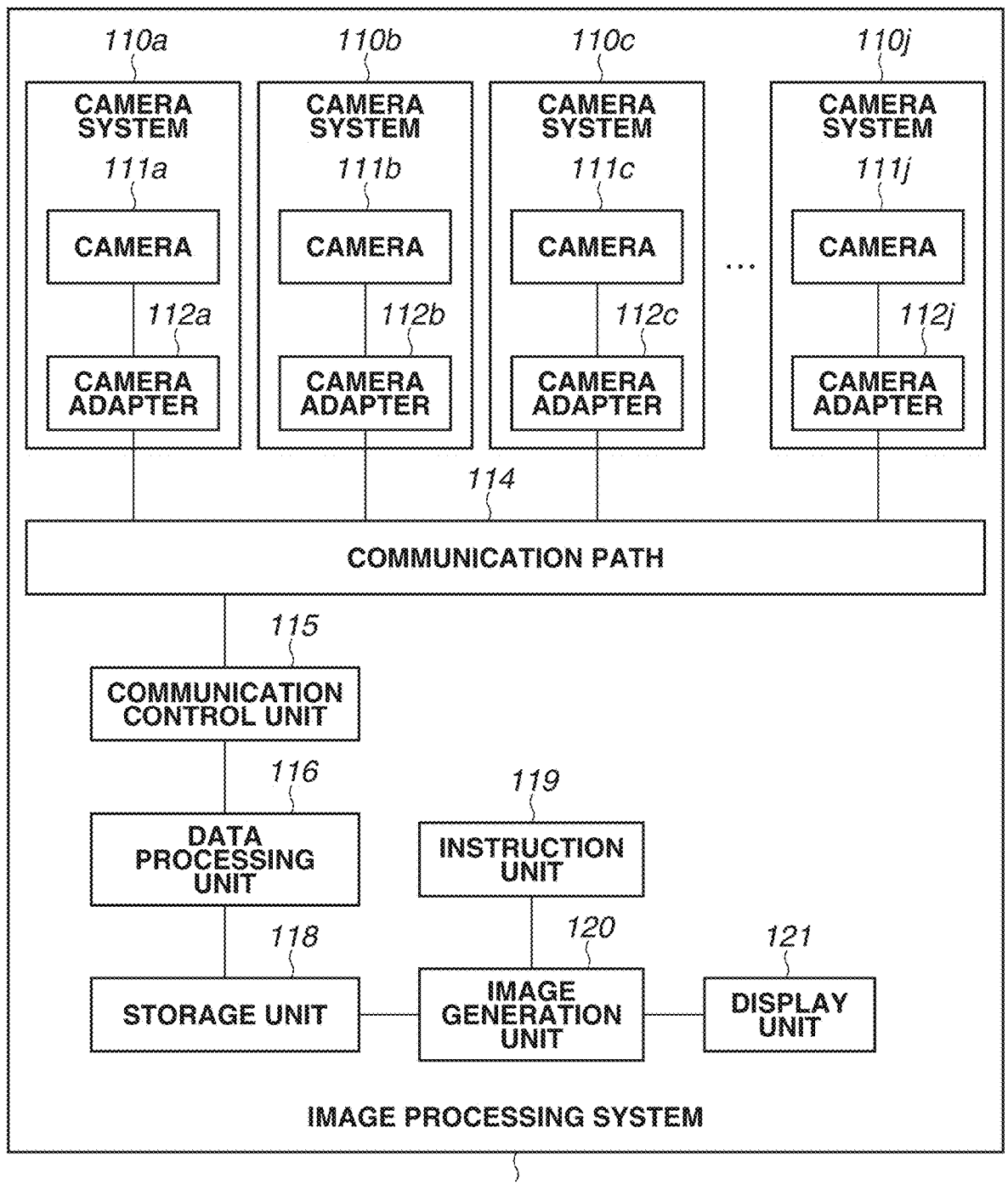
FIG. 1 is a diagram illustrating an example of a configuration of an image processing system.

FIG. 1 is a diagram illustrating an example of a configuration of an image processing system 10. The image processing system 10 is a system configured to generate a virtual viewpoint image that represents how something is viewed from a designated virtual viewpoint based on a plurality of images captured by image capturing performed using a plurality of cameras and the designated virtual viewpoint. While the virtual viewpoint image in the present exemplary embodiment is a viewpoint image that is also referred to as "free-viewpoint image", the virtual viewpoint image is not limited to an image corresponding to a viewpoint that is designated freely (as desired) by a user, and examples of the virtual viewpoint image also include an image corresponding to a viewpoint that is selected from a plurality of candidates by a user. While a case of designating a virtual viewpoint by a user operation will mainly be described in the present exemplary embodiment, a virtual viewpoint may be designated automatically by the image processing system 10 based on an image analysis result. While a case in which the virtual viewpoint image is a moving image will mainly be described in the present exemplary embodiment, the virtual viewpoint image to be processed by the image processing system 10 may be a still image.

In the present exemplary embodiment, the virtual viewpoint image generated by the image processing system 10 is not limited to those that faithfully represent how a real space is viewed from a virtual viewpoint. The image processing system 10 generates the virtual viewpoint image that contains a plurality of objects captured in a plurality of image capturing situations different from each other in at least one of an image capturing time point and an image capturing location. The image processing system 10 will be described below.

The image processing system 10 includes ten sets of camera systems 110a to 110j. Each of the camera systems 110a to 110j includes one camera 111 and one camera adapter 112 which are connected via an internal line. The number of camera systems 110 of the image processing system 10 is not limited to that in the example illustrated in FIG. 1. Hereinafter, when the camera systems 110a to 111j are not distinguished, the camera systems 110a to 111j will be referred to simply as "camera system 110". Similarly, when the cameras 111 and the camera adapters 112 are not distinguished, the cameras 111 and the camera adapters 112 will be referred to as "camera 111" and "camera adapter 112", respectively, whereas when the cameras 111 and the camera adapters 112 are distinguished, the cameras 111 and the camera adapters 112 will be referred to as "cameras 111a to 111j" and "camera adapters 112a to 112j". The camera adapter 112 of the camera system 110 performs image processing and compression processing on a captured image acquired by the camera 111 and outputs processed image data to a communication path 114. The communication path 114 transmits the data output from the camera system 110 to a communication control unit 115 via a network cable.

Figure 2A:
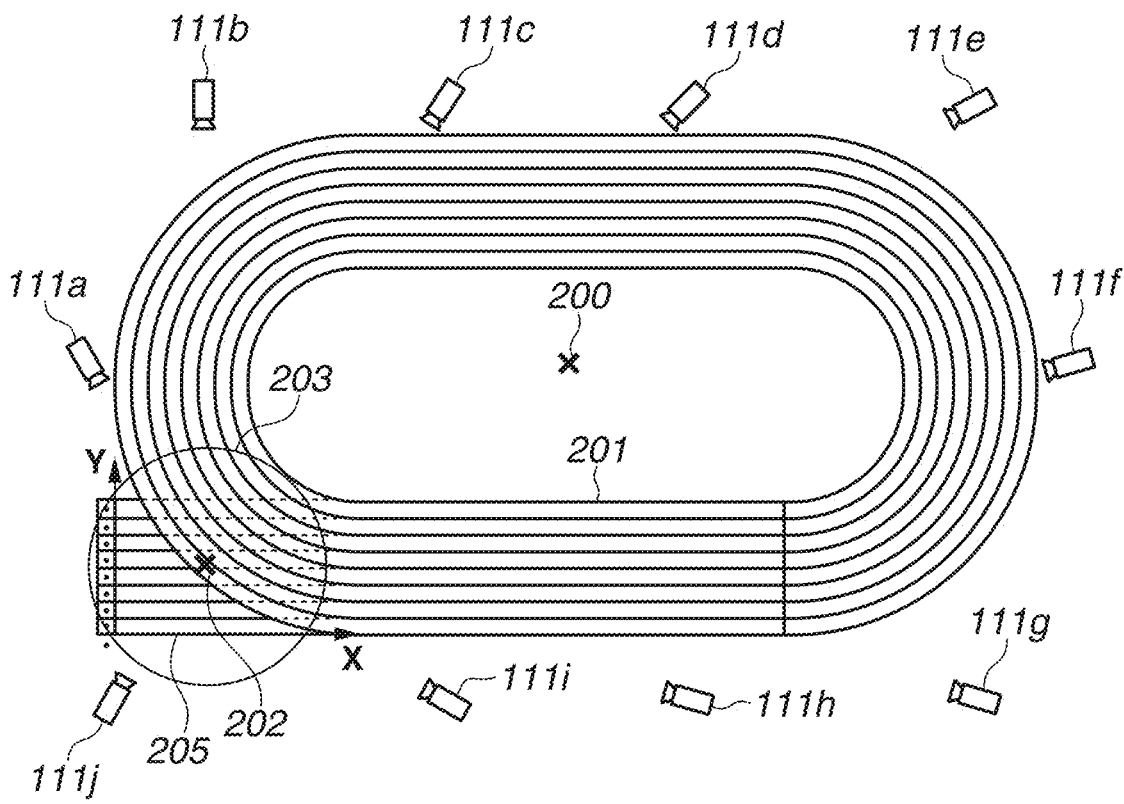
FIGS. 2A and 2B are diagrams each illustrating an example of an arrangement of a camera system.

The plurality of cameras 111 is provided at different positions from one another so as to surround a predetermined image capturing region and synchronously captures the image capturing region from a plurality of directions. The image capturing region is, for example, an athletic field where a track and field event or soccer is held or a stage where a concert or play is held. FIG. 2A illustrates an example in which the plurality of cameras 111 is provided on an athletic field. The plurality of cameras 111 provided around a track 201 is each directed to a target point 202 and captures a range including an image capturing region 203. The plurality of cameras 111 does not have to be disposed all over the entire circumference of the track 201 and may be provided only in some directions from the track 201, depending on an installation location restriction. The image processing system 10 may include the cameras 111 that have different functions, such as a telephoto camera and a wide-angle camera. While the plurality of cameras 111 is all provided at the same height from the ground, the arrangement is not limited to that described above, and the plurality of cameras 111 may be provided at different heights.

Figure 2B:
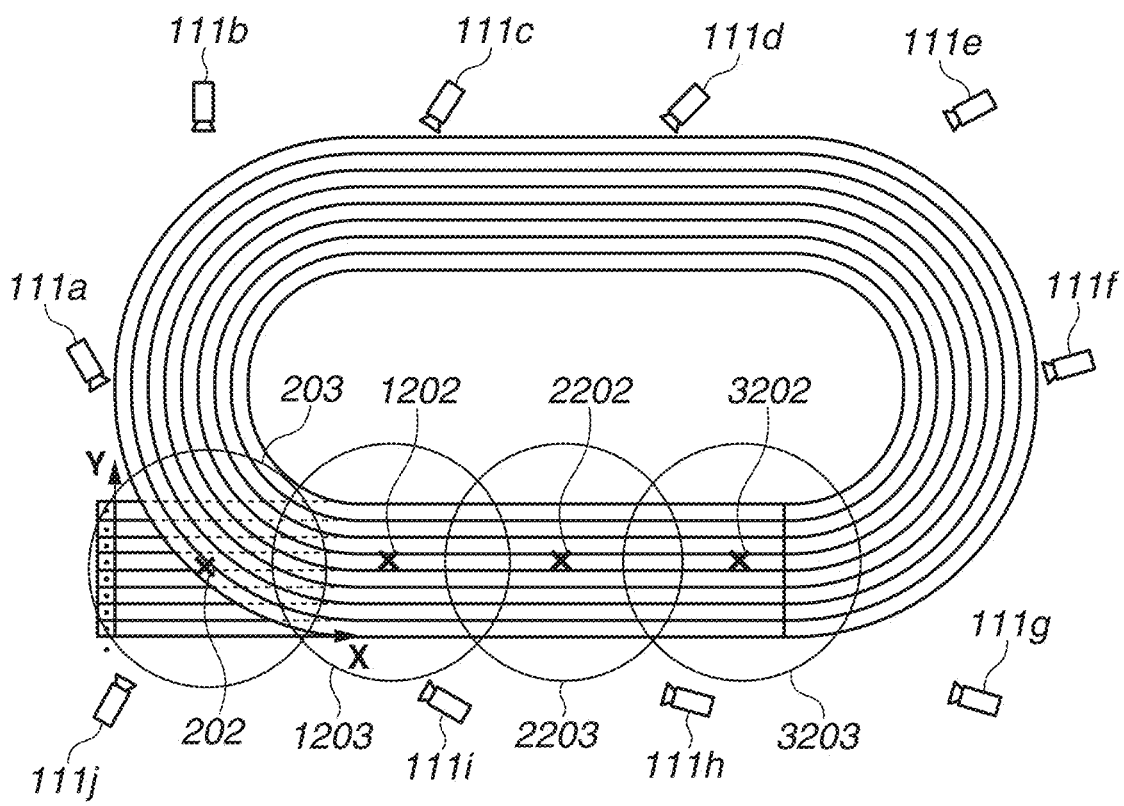

Further, not every one of the plurality of cameras 111 of the image processing system 10 needs to be directed to a single target point, and the image processing system 10 may include, for example, a group of the cameras 111 directed to a target point and another group of the cameras 111 directed to another target point. For example, ten cameras 111 may be directed to each of the target points 202, 1202, 2202, and 3202 in FIG. 2B. With this arrangement, a virtual viewpoint image of an entire lane of a 100-meter dash covered by the image capturing regions 203, 1203, 2203, and 3203 can be generated. The directions of the cameras 111 do not have to be fixed and, for example, the position of the target point 202 to which the plurality of cameras 111 is directed may be changed as a player runs. The plurality of cameras 111 having a wide angle of view may be directed to a target point near the center of the 100-meter lane so that every one of the cameras 111 can capture the entire 100-meter lane.

The image processing system 10 includes the communication control unit 115, a data processing unit 116, a storage unit 118, an instruction unit 119, an image generation unit 120, and a display unit 121, in addition to the camera systems 110 and the communication path 114. While the above-described components are separate apparatuses in the present exemplary embodiment, the configuration is not limited to that described above. For example, a single apparatus may include the instruction unit 119 and the display unit 121 and may further include the image generation unit 120. While FIG. 1 illustrates the configuration in which one display unit 121 is connected to the image generation unit 120 as an example, the configuration is not limited to that illustrated in FIG. 1, and a plurality of display units 121 may be connected to the image generation unit 120. Similarly, a plurality of image generation units 120 may be connected to the storage unit 118.

The communication control unit 115 controls communication between the apparatuses included in the image processing system 10. The communication control unit 115 also has a time server function of synchronizing the time points of the plurality of camera systems 110 by generating a time point synchronization signal and transmitting the generated time point synchronization signal to the plurality of camera systems 110. The communication control unit 115 may instruct the camera systems 110 to set an image capturing condition or to start/end image capturing.

The data processing unit 116 processes data output from the camera systems 110 and stores the processing result in the storage unit 118. For example, the data processing unit 116 stores image data output from the camera systems 110 in the storage unit 118, in association with image capturing information about an image capturing condition of the cameras 111 of the camera systems 110. The image capturing information contains information about, for example, installation positions, image capturing directions, and zoom values of the cameras 111. The installation positions and the image capturing directions of the cameras 111 are represented by coordinate values on a coordinate system 205 illustrated in FIG. 2A. The information included in the image capturing information, however, is not limited to that described above and, for example, information about the positions of the cameras 111 and the position of a center 200 of the athletic field that are represented by latitudes and longitudes may be stored together with the data output from the camera systems 110. While the image capturing information about the cameras 111 is input from each camera system 110 to the data processing unit 116, the configuration is not limited to that described above, and the image capturing information may be input from another apparatus, or a user may manually input the image capturing information by operating the data processing unit 116.

The storage unit 118 stores data output from the data processing unit 116, such as a plurality of images (images of a plurality of viewpoints) based on the synchronous image capturing by the plurality of cameras 111 from a plurality of directions, in a recording medium such as a hard disk drive, solid state drive (SSD), or secure digital (SD) card. In the present exemplary embodiment, the data that is stored in the storage unit 118 and is based on the image capturing contains a foreground image acquired as a result of foreground/background separation performed by the camera adapters 112 on an image captured by the cameras 111. The foreground/background separation by the camera adapters 112 is the processing of acquiring a foreground image by extracting a region corresponding to a predetermined object (foreground object) such as a person contained in the captured image, and a background image by excluding the foreground image from the captured image.

The data that is stored in the storage unit 118 and is based on the image capturing may contain not only the foreground image but also the background image and/or may contain data that specifies a three-dimensional shape of the foreground object contained in the captured image and data that specifies a three-dimensional shape of a background object such as an athletic field. Hereinafter, a three-dimensional model corresponding to three-dimensional shape data about the foreground object will be referred to as "foreground model", whereas a three-dimensional model corresponding to three-dimensional shape data about the background object will be referred to as "background model". An image captured by the camera 111 may be stored directly in the storage unit 118.

The instruction unit 119 includes an operation unit, such as a joystick, button, or touch panel, and receives a user operation relating to the generation of a virtual viewpoint image and outputs instruction information corresponding to the user operation to the image generation unit 120. The user operation relating to the generation of a virtual viewpoint image is, for example, an operation of inputting an instruction to start generating a virtual viewpoint image, an operation of designating a position and direction of a virtual viewpoint, or an operation of selecting an object to be displayed on a virtual viewpoint image. Details of the selection of an object to be displayed will be described later. The user does not have to precisely designate a virtual viewpoint with respect to an entire period of a virtual viewpoint image to be viewed. For example, at least one of the position and direction of a virtual viewpoint may be determined automatically, or the user may select a virtual viewpoint to be employed from a plurality of automatically-set virtual viewpoints.

The instruction information output from the instruction unit 119 to the image generation unit 120 contains viewpoint information that specifies the position and direction of the set virtual viewpoint. The viewpoint information contains information about the position and direction of the virtual viewpoint at each time point during a virtual viewpoint image generation target period. Alternatively, the viewpoint information may contain information about an angle of view, focal length, and focal point position of a virtual camera corresponding to the virtual viewpoint. The instruction information output from the instruction unit 119 contains identification information about the object to be displayed in the virtual viewpoint image in addition to the viewpoint information. The identification information about the object to be displayed is specified by, for example, the name and identifier (ID) of a player corresponding to the object and the time point of a race.

The image generation unit 120 generates, based on the data that is based on image capturing and is acquired from the storage unit 118 and the viewpoint information acquired from the instruction unit 119, a virtual viewpoint image corresponding to the virtual viewpoint specified by the viewpoint information. Then, the image generation unit 120 outputs the generated virtual viewpoint image to the display unit 121. An output destination of the virtual viewpoint image is not limited to the display unit 121, and the virtual viewpoint image may also be output to other storage apparatuses.

An example of a method for generating a virtual viewpoint image is as follows. First, the image generation unit 120 generates a three-dimensional model (foreground model) of a foreground object captured by the plurality of cameras 111 based on a plurality of foreground images acquired from the storage unit 118. Then, the image generation unit 120 maps the foreground images with respect to the generated foreground model based on the viewpoint information acquired from the instruction unit 119 and performs rendering, to generate an image of the foreground object viewed from the virtual viewpoint. The image generation unit 120 maps the background image on the background model acquired from the storage unit 118, based on the viewpoint information, and performs rendering. The image generation unit 120 combines the foreground rendering result and the background rendering result to generate a virtual viewpoint image. Examples of a method for generating a virtual viewpoint image are not limited to that described above, and various methods may be employed, such as a method for generating a virtual viewpoint image by performing projection conversion on an image based on the image capturing without using three-dimensional models.

The display unit 121 includes, for example, a liquid crystal display and displays the virtual viewpoint image generated by the image generation unit 120. Alternatively, the display unit 121 may display a graphical user interface (GUI) for the user to operate the instruction unit 119.

[Configuration of Image Generation Unit]

Figure 3:
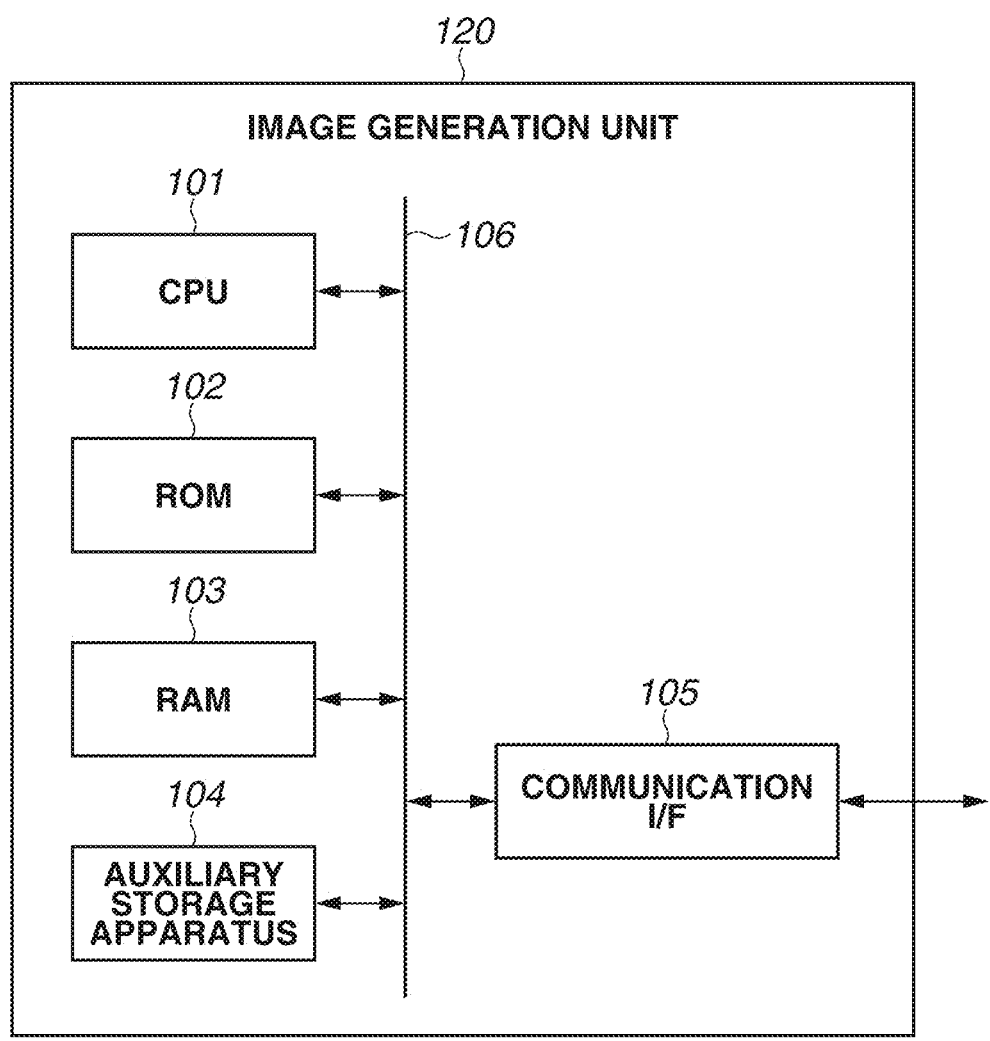
FIG. 3 is a diagram illustrating an example of a hardware configuration of an image generation unit.

Next, a hardware configuration of the image generation unit 120 will be described below with reference to FIG. 3. The other apparatuses included in the image processing system 10, such as the communication control unit 115 and the data processing unit 116, may have a similar hardware configuration to that of the image generation unit 120. The image generation unit 120 includes a central processing unit (CPU) 101, a read-only memory (ROM) 102, a random access memory (RAM) 103, an auxiliary storage apparatus 104, a communication interface (I/F) 105, and a bus 106.

The CPU 101 controls the entire image generation unit 120 using a computer program and data stored in the ROM 102 or the RAM 103. The image generation unit 120 may include a single piece of or plurality of pieces of dedicated hardware different from the CPU 101 and the dedicated hardware may execute at least part of the processing of the CPU 101. Examples of dedicated hardware include an application-specific integrated circuit (ASIC), a field programmable gate array (FPGA), and a digital signal processor (DSP). The ROM 102 stores a program and parameter that do not need to be changed. The RAM 103 temporarily stores a program and data supplied from the auxiliary storage apparatus 104 and data that is externally supplied via the communication I/F 105. The auxiliary storage apparatus 104 includes, for example, a hard disk drive and stores various types of data such as image data and viewpoint information.

The communication I/F 105 is used for communication with an external apparatus such as the instruction unit 119 and the display unit 121. For example, in a case in which the display unit 121 is wire-connected with the external apparatus, a cable for communication is connected to the communication I/F 105. In a case in which the image generation unit 120 has a function of wirelessly communicating with the external apparatus, the communication I/F 105 includes an antenna. The bus 106 connects the components of the image generation unit 120 and transmits information.

[Operation Sequence of Image Processing System]

An example of an operation sequence of the image processing system 10 will be described below with reference to FIG. 4. In the present exemplary embodiment, a case of generating a virtual viewpoint image of a 100-meter dash of a track and field event as an image capturing target will be described as an example. The sequence illustrated in FIG. 4 is started at a timing at which the plurality of camera systems 110 is provided on an athletic field and the initial setting of each apparatus included in the image processing system 10 is completed. The timing to start the sequence illustrated in FIG. 4, however, is not limited to that described above.

Figure 5A:
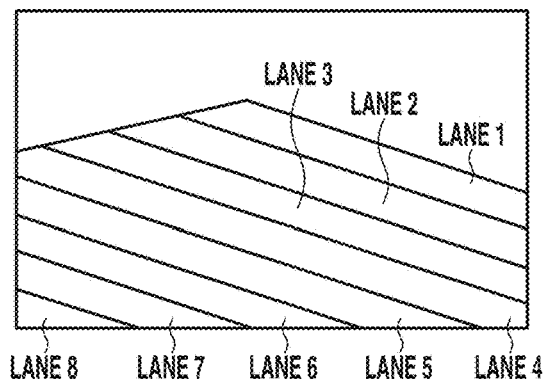
FIGS. 5A to 5G are diagrams each illustrating an example of an image generated by the image processing system.

In step S501, the plurality of cameras 111 of the plurality of camera systems 110 acquires a reference image by capturing 100-meter lanes from a plurality of directions in a state in which there is no player in an athletic track before a race (state illustrated in FIG. 5A). In step S502, the plurality of cameras 111 of the plurality of camera systems 110 captures the 100-meter lanes from a plurality of directions in a state in which players are running in a race. In this process, the plurality of cameras 111 acquires, for example, captured images of a plurality of competitions conducted at different timings, such as an image (image illustrated in FIG. 5B) of a preliminary game of a 100-meter dash and an image (image illustrated in FIG. 5D) of a final game of the 100-meter dash. The images captured and acquired by the cameras 111 are held by the camera adapters 112. The number of cameras 111 to be used in each image capturing process may differ. For example, all the ten cameras 111 may be used to capture the race of the final game and five cameras 111 may be used to capture the race of the preliminary game.

In step S503, the camera adapter 112 of each camera system 110 performs foreground/background separation on each of the plurality of captured images acquired by the cameras 111. Specifically, the camera adapter 112 extracts a foreground image that is an image of a player region in the captured images acquired in step S502, based on a difference between the captured images acquired in step S502 and the reference image acquired in step S501. For example, a foreground image of players A, E, and D specified in FIG. 5C is extracted from the captured image of the preliminary game in FIG. 5B, whereas a foreground image of players A, B, and C specified in FIG. 5E is extracted from the image of the final game in FIG. 5D.

In step S504, the camera systems 110 output the foreground images acquired in step S503, and the output foreground images are transmitted to the image generation unit 120 via the communication path 114 and the storage unit 118. The data transmitted from the camera systems 110 to the image generation unit 120 in step S504 may contain the image of the 100-meter lanes acquired in step S501 and a background image that is an image of a region other than the player region extracted by the foreground/background separation in step S502. Alternatively, image capturing information about the image capturing performed by the camera 111 may also be transmitted. While the data is stored in the storage unit 118 and then acquired by the image generation unit 120 in the present exemplary embodiment, the data may be input not via the storage unit 118 but directly to the image generation unit 120.

In FIG. 4, an example of a case in which the data that is based on the image capturing of the plurality of races is collectively transmitted in step S504 is illustrated. Specifically, in step S504, the image generation unit 120 collectively acquires the data that is based on the image capturing from the plurality of directions in an image capturing situation and the data that is based on the image capturing from the plurality of directions in another image capturing situation that is different in the image capturing time point. The processing, however, is not limited that described above, and each time a race ends, data about the race may be transmitted, or data generated during the race may be transmitted sequentially. The processing in step S504 may be performed after or in parallel with the processing in step S505 described below.

In step S505, the instruction unit 119 inputs instruction information based on a user operation and an instruction to generate a virtual viewpoint image to the image generation unit 120. The instruction information contains viewpoint information and identification information. The viewpoint information specifies the position and direction of a virtual viewpoint, and the identification information is for identifying an object to be displayed on the virtual viewpoint image. For example, the user selects a plurality of image capturing target objects to be compared, such as the player A in the race of the preliminary game and the same player A in the race of the final game, using the instruction unit 119. The objects to be selected do not have to be the same player and, for example, the player A in the preliminary game and the player B in the final game may be selected. Since basically one player runs in each lane in a 100-meter dash, a user may select a race (preliminary game or final game) and a lane instead of selecting a player. In this case, the identification information to be input to the image generation unit 120 may be the number or time point of the race and the number of the lane.

In step S506, the image generation unit 120 generates a three-dimensional model of each object identified by the identification information input via the instruction unit 119, based on the data such as the foreground images acquired in step S504. For example, the image generation unit 120 generates a model of the player A at an image capturing time point that is one second after the start of the preliminary game and a model of the player A at an image capturing time point that is one second after the start of the final game. The models can be generated using, for example, a visual hull method, and each model generated using the method is formed by a set of points (voxels) on a three-dimensional space. The three-dimensional position of each point forming the model is specified by coordinate values on the coordinate system 205 illustrated in FIG. 2A in which, for example, the x-, y-, and z-axes respectively represent the longer-side direction, shorter-side direction, and height direction of the 100-meter lanes. The three-dimensional models of the objects are not limited to those that are formed by a set of points and may be specified by, for example, a polygon mesh.

In step S507, the image generation unit 120 arranges the plurality of foreground models generated in step S506 in the same virtual space and performs rendering based on the viewpoint information acquired in step S505, to generate a foreground object image viewed from the virtual viewpoint. Then, the image generation unit 120 combines the foreground object image with a background object image such as the 100-meter lanes that is generated based on the image acquired in step S501 and the viewpoint information. In this way, the virtual viewpoint image that contains images of the plurality of objects captured at the plurality of different image capturing time points and the background image and corresponds to the virtual viewpoint specified by the viewpoint information is generated. For example, in the case in which the player A in the preliminary game and the player A in the final game are user-selected objects, a virtual viewpoint image as illustrated in FIG. 5F is generated. The generated virtual viewpoint image is output to the display unit 121.

The background object image is not limited to that generated using the image acquired in step S501 and may be generated using a background image extracted from an image captured during the preliminary game or may be generated using a background image extracted from an image captured during the final game. Alternatively, the background object image may be generated by computer graphics without using the captured images. The image generation unit 120 may generate the virtual viewpoint image by combining the plurality of foreground object images without combining the background image. Whether to include the background image in the virtual viewpoint image and whether to include the background image of which image capturing situation may be determined based on the user input via the instruction unit 119.

While the player A in the preliminary game and the player A in the final game are respectively displayed at the positions (lanes 1 and 5) at the time of image capturing in the example illustrated in FIG. 5F, the position of the object displayed in the virtual viewpoint image may be different from the position of the object at the time of image capturing. For example, a virtual viewpoint image in which the position of the player A in the preliminary game is changed from lane 5 to lane 2 may be generated as illustrated in FIG. 5G so that the player A in the preliminary game and the player A in the final game are displayed near each other, which makes it easy for the user viewing the virtual viewpoint image to compare how the player A runs in the preliminary game and in the final game.

The display position of the object can be changed by changing coordinate information contained in three-dimensional shape data corresponding to the foreground model when the object foreground model is arranged in a virtual space. For example, the coordinates of each point forming the model are specified by the coordinate system 205 illustrated in FIG. 2A, and the width of one lane is Y1. In this case, 3Y1 is added to the value of the y-coordinate of each point forming the model of the player A in the preliminary game. In this way, the model of the player A in the preliminary game is arranged at a position that is separated by a predetermined amount of three lanes from a position in a virtual space that corresponds to the position of the player A at the time of image capturing in the preliminary game, whereby the position of the player A in the preliminary game is changed from lane 5 to lane 2 in the virtual viewpoint image. Meanwhile, the model of the player A in the final game is arranged in the position in a virtual space that corresponds to the position of the player A at the time of image capturing in the final game, so that the position of the player A in the final game in the virtual viewpoint image is not changed from lane 1.

Changing the display position of the object as described above is effective also in a case in which, for example, the user desires to compare a plurality of objects captured at the same position at different time points, such as a player who runs in lane 3 in a preliminary game and a player who runs in lane 3 in a final game. Specifically, the coordinate information about one of the objects is changed and the plurality of objects is arranged so as not to overlap in a virtual space, whereby the plurality of objects is prevented from overlapping and becoming difficult to recognize in the virtual viewpoint image so that the objects can be compared with ease.

While the virtual viewpoint image containing two objects (the player A in the preliminary game and the player A in the final game) is generated in the above-described example, the number of objects to be contained in a virtual viewpoint image is not limited to two, and a virtual viewpoint image containing three or more objects may be generated. For example, a virtual viewpoint image containing the players A and E in the preliminary game and the players A and B in the final game may be generated. For example, a virtual viewpoint image containing the player A in the preliminary game, the player A in a semi-final game, and the player A in the final game may be generated.

While the case in which the image generation unit 120 generates the separate images of the foreground object and the background object viewed from the virtual viewpoint and then combines the images to generate a final virtual viewpoint image is described above with reference to FIG. 5, the generation is not limited to that described above, and the image generation unit 120 may generate a virtual viewpoint image by arranging the foreground model and the background model in the same virtual space and rendering the arranged models together. The image generation unit 120 may generate a virtual viewpoint image by combining the background image with a plurality of images acquired by separately rendering the foreground models of the plurality of user-selected objects. In this case, the image of the object located far from the virtual viewpoint is superimposed on the background image, and then the image of the object located close to the virtual viewpoint is superimposed.

While the case in which the image generation unit 120 acquires the foreground and background images extracted from the captured images from the camera systems 110 and generates the object models is described above with reference to FIG. 5, the processing is not limited to that described above. For example, foreground and background images and foreground and background models may be generated by the camera systems 110 or the data processing unit 116 and then stored in the storage unit 118. Then, the image generation unit 120 may acquire the stored data from the storage unit 118. For example, the captured images may be stored in the storage unit 118, and the image generation unit 120 may generate foreground and background images and foreground and background models based on the captured images acquired from the storage unit 118. Foreground and background models may be generated separately using different apparatuses. In the case in which the camera systems 110 perform the process up to the generation of the models, the image generation unit 120 can promptly generate a virtual viewpoint image when the viewpoint information is input via the instruction unit 119. Meanwhile, in the case in which the image generation unit 120 generates the models, the processing of generating a model other than those of the objects to be displayed is reduced.

While, in the aforementioned case according to the present exemplary embodiment, a virtual viewpoint image is generated by generating the model of the player A in the preliminary game and the model of the player A in the final game and then rendering the generated models, the generation is not limited to that described above. A virtual viewpoint image may be generated by, for example, combining an image of the player A in the preliminary game that is generated by projection conversion of a captured image without using a three-dimensional model with an image of the player A in the final game that is generated using a three-dimensional model or by projection conversion. With this method, the amount of processing involved in generating a virtual viewpoint image may be reduced. Meanwhile, with the method using the three-dimensional models of the objects, the degree of freedom of the virtual viewpoint is increased and the plurality of objects is prevented from being abnormally displayed in the virtual viewpoint image.

[Process by Image Generation Unit]

A process by the image generation unit 120 that corresponds to the sequence described above with reference to FIG. 5 will be described below with reference to FIG. 6. The process illustrated in FIG. 6 is started at a timing at which the image generation unit 120 is connected to other apparatuses such as the storage unit 118 and the instruction unit 119 and the initial setting is completed. The timing to start the process illustrated in FIG. 6, however, is not limited that described above. The CPU 101 of the image generation unit 120 develops a program stored in the ROM 102 to the RAM 103 and executes the developed program to realize the process illustrated in FIG. 6. At least part of the process illustrated in FIG. 6 may be realized by a single piece of or a plurality of pieces of dedicated hardware different from the CPU 101.

In step S700, the foreground images based on the image capturing using the cameras 111 are acquired from the storage unit 118. In step S701, the instruction information based on a user operation is acquired from the instruction unit 119. In step S702, a foreground model is generated using the foreground image that is acquired in step S700 and relates to the player A in the preliminary game race, which is one of the objects identified by the instruction information. In step S703, the foreground model of the player A in the preliminary game is arranged in a virtual space. The position of the foreground model in a virtual space is the position specified by the coordinate information contained in the three-dimensional shape data based on the foreground model, i.e., the position corresponding to the position of the player A in the preliminary game at the time point of image capturing by the camera 111. The object position may be changed as described above with reference to FIG. 5G by changing the coordinate information of the three-dimensional shape data. In step S704, the foreground model of the player A in the preliminary game in a virtual space is rendered based on the virtual viewpoint specified by the viewpoint information contained in the instruction information.

In step S705, a foreground model is generated using the foreground image that is acquired in step S700 and relates to the player A in the final game race, which is one of the objects identified by the instruction information. In step S706, the foreground model of the player A in the final game is arranged in a virtual space. The position of the foreground model in a virtual space corresponds to the position of the player A in the final game at the time point of image capturing by the camera 111. The object position may be changed as described above with reference to FIG. 5G by changing the coordinate information of the three-dimensional shape data. In step S707, the foreground model of the player A in the final game in a virtual space is rendered based on the virtual viewpoint specified by the viewpoint information contained in the instruction information. In step S708, the background model such as the 100-meter lanes is rendered based on the virtual viewpoint specified by the viewpoint information.

In step S709, which one of the player A in the preliminary game and the player A in the final game is closer to the virtual viewpoint in a virtual space is determined. In a case where the player A in the preliminary game is closer (YES in step S709), then in step S710, the rendering result of the player A in the final game is superimposed on the background rendering result, and then the rendering result of the player A in the preliminary game is superimposed in front. Meanwhile, in a case where the player A in the final game is closer to the virtual viewpoint (NO in step S709), then in step S711, the rendering result of the player A in the preliminary game is superimposed on the background rendering result, and then the rendering result of the player A in the final game is superimposed in front. In step S712, the virtual viewpoint image generated by combining the rendering results in step S710 or S711 is output to the display unit 121.

[Adjustment of a Plurality of Objects Captured at Different Time Points]

With the image processing system 10, a virtual viewpoint image that displays a plurality of image capturing target objects captured at different time points is generated as described above. The objects of which time point are to be displayed in the virtual viewpoint image may be designated by a user operation input via the instruction unit 119. However, it is inconvenient for the user to determine and designate each time point when, for example, the user desires to compare the player A at a time point that is one second after the start of the preliminary game race and the player A at a time point that is one second after the start of the final game. Further, in a case of generating a moving image using a virtual viewpoint image, if the user designates a time point corresponding to an object to be displayed for each frame of the moving image, it is significantly inconvenient to the user. Thus, the image processing system 10 stores image capturing time point information and predetermined event occurrence time point information, such as information about a time point at which a race is started, in the storage unit 118. Then, the image generation unit 120 generates a virtual viewpoint image based on the data acquired from the storage unit 118, whereby the user convenience increases.

Specifically, the data processing unit 116 stores, in the storage unit 118, data such as the foreground images based on the image capturing by the cameras 111 together with image capturing time point information about the image capturing. Examples of the image capturing time point information include, but are not limited to, a frame number of a moving image captured by the cameras 111 or information that specifies a standard time. The data processing unit 116 also stores identification information about each piece of data stored in the storage unit 118. Using the identification information, each piece of the data can be identified as data acquired based on image capturing performed for which competition. The identification information specifies a competition name, competition date and time, and competition venue. The content of the competition identification information is not limited to those described above and may be, for example, an identification number assigned to the competition.

Further, the data processing unit 116 stores, in the storage unit 118, the predetermined event occurrence time point information about the time point at which the predetermined event occurs in the competition. The predetermined event occurrence time point information specifies, for example, the standard time and a frame number of a moving image of the cameras 111 that corresponds to the time point, but the content of start time point information is not limited to that described above. The predetermined event occurrence time point information is, for example, a competition start time point such as a timing of a start of a track event of a track and field competition. The predetermined event occurrence time point information is not limited to those described above and can be a jump-start timing in a jumping event or a throwing timing in a throwing event. The competition identification information and the predetermined event occurrence time point information are input by a user operation performed on the data processing unit 116. Alternatively, at least one of the pieces of information may be input from another apparatus, or the data processing unit 116 may acquire the information by analyzing the images based on the image capturing performed by the cameras 111.

Since the various types of information described above are stored in the storage unit 118, the image generation unit 120 can determine which competition the data acquired from the storage unit 118 is about and how many seconds are there after (or before) the predetermined event when the image capturing on which the data is based is performed. Then, in a case in which a plurality of image capturing targets in a plurality of competitions is designated as objects to be displayed in a virtual viewpoint image, the image generation unit 120 can generate a virtual viewpoint image using a plurality of images selected using the time point at which the predetermined event occurs in each competition as a reference.

For example, a case in which the player A in the preliminary game of the 100-meter dash race and the player A in the final game of the 100-meter dash race are selected as an object to be displayed via the instruction unit 119 will be described below. In this case, the image generation unit 120 acquires the foreground image of the player A at the start time point of the preliminary game race and the foreground image of the player A at the start time point of the final game race from the storage unit 118 and generates a virtual viewpoint image of a first frame of a moving image using the acquired images. Then, the image generation unit 120 generates a virtual viewpoint image of a second frame of the moving image using the foreground image of the player A that is one frame after the start time point of the preliminary game race and the foreground image of the player A that is one frame after the start time point of the final game race.

The image generation unit 120 repeats the above-described processing and generates the virtual viewpoint images of the plurality of frames using the foreground images of the player A during a predetermined period from the start time point of the preliminary game race and the foreground images of the player A during the predetermined period of the same length from the start time point of the final game race. In this way, the moving image of the 100-meter dash in which the player A in the preliminary game and the player A in the final game are running is generated. The predetermined period may be, for example, a period that includes a period from a start to a finish of the player A and may also include a period before the start and/or a period after the finish.

In a case in which the frame rate of the image capturing by the cameras 111 in the preliminary game is different from that in the final game, adjustment is performed based on the difference between the frame rates. For example, in a case in which the frame rate in the final game is double the frame rate in the preliminary game, a virtual viewpoint image is generated using the foreground image of the nth frame from the start time point of the preliminary game and the foreground image of the (n/2)th frame from the start time point of the final game. Further, the image generation unit 120 may associate the foreground image based on the image capturing in the preliminary game and the foreground image based on the image capturing in the final game based on not their frame numbers but their image capturing time points.

Figure 7A:
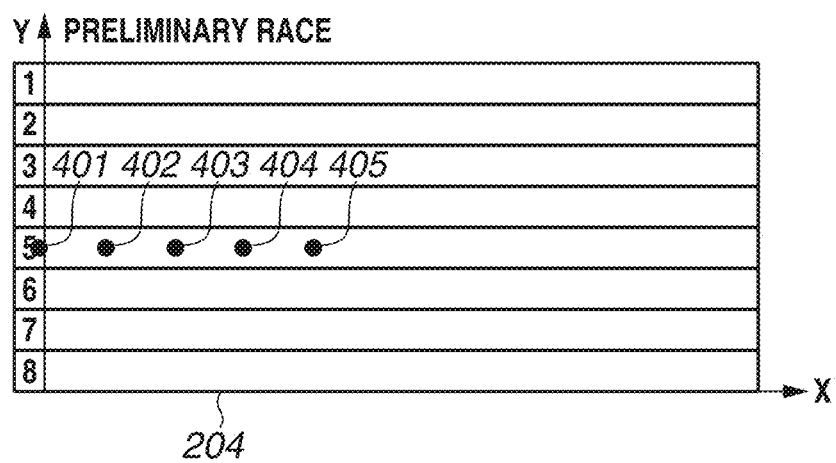
FIGS. 7A to 7D are diagrams each illustrating a movement of an image capturing target.
Figure 7B:
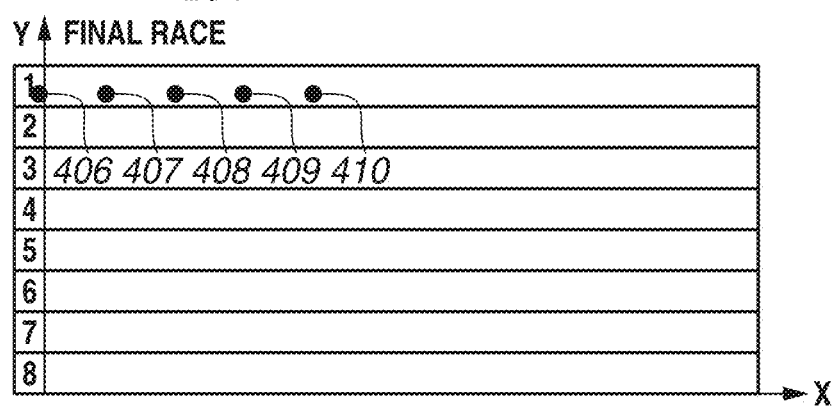

FIG. 7A illustrates the position of the player A at a plurality of time points in the preliminary game race. At the start time point of the preliminary game race, the player A is at a position 401, and one second after the start, the player A is at a position 402. Similarly, two, three, and four seconds after the start time point, the player A is at positions 403, 404, and 405, respectively. Positions 406, 407, 408, 409, and 410 in FIG. 7B are respectively the positions of the player A at the start time point of the final game race and one, two, three, and four seconds after the start time point of the final game race.

Figure 7C:
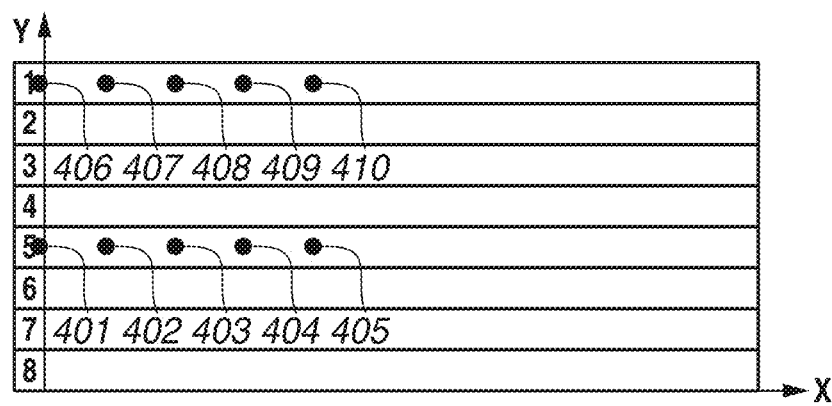
Figure 7D:
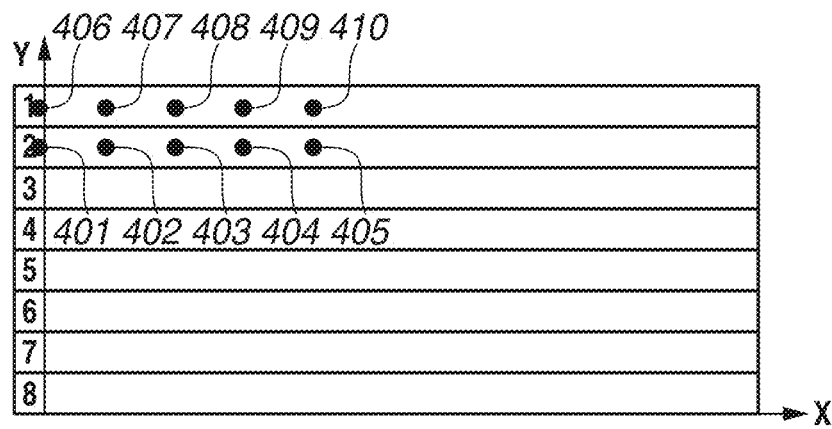
Figure 8:
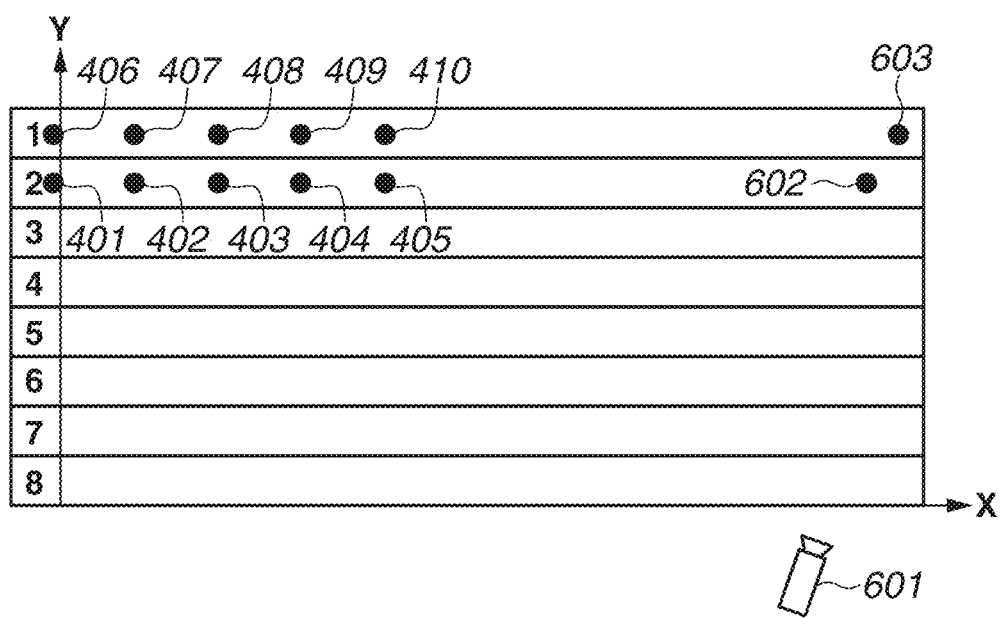
FIG. 8 is a diagram illustrating an example of a positional relationship between a virtual viewpoint and an object.
Figure 9:
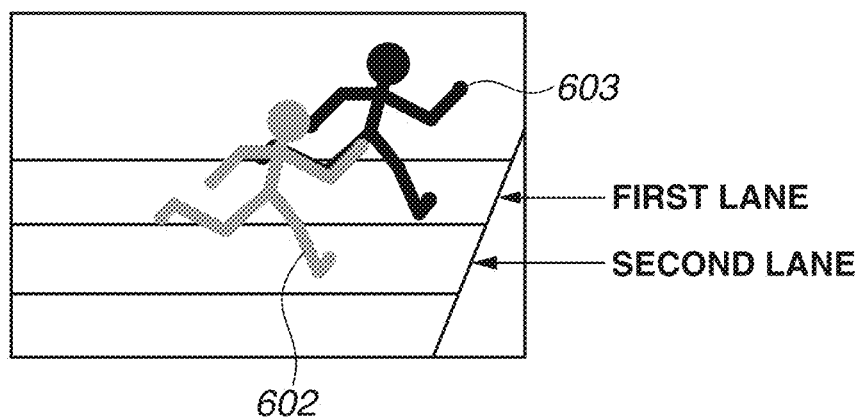
FIG. 9 is a diagram illustrating an example of a generated virtual viewpoint image.

The virtual viewpoint images are generated using the images based on the image capturing of the player A at the plurality of time points in the preliminary game race and the final game race as described above so that a moving image in which the player A in the preliminary game and the player A in the final game are as though running at the same time is generated, as schematically illustrated in FIG. 7C. Further, as illustrated in FIG. 7D, the display position of the player A in the preliminary game may be moved in the Y-axis direction (the direction in which the 100-meter lanes are aligned) of the coordinate system 205 so that a moving image in which the player A in the preliminary game and the player A in the final game are as though running in adjacent lanes is generated. FIG. 8 illustrates a position 602 of the player A and a position 603 of the player A in the final game immediately before a finish and a virtual viewpoint 601, and FIG. 9 illustrates an example of a virtual viewpoint image of a frame corresponding to the timing.

To display the players captured at different time points in the same virtual viewpoint image as described above, time information about three-dimensional shape data about the objects may be modified and rendered. For example, time information about the player A in the preliminary game and time information about the player A in the final game may both be modified in such a manner that the model of the player A in the preliminary game and the model of the player A in the final game are arranged as appropriate in the same virtual space. Further, for example, the time information about the player A in the final game may be modified based on the time information about the player A in the preliminary game in such a manner that the model of the player A in the final game is arranged as appropriate in a virtual space where the model of the player A in the preliminary game is arranged.

With the virtual viewpoint image generated by the above-described method, the user can compare how the player A runs in the preliminary game and how the player A runs in the final game in a single still or moving image with ease. Further, since the position and direction of the virtual viewpoint can be designated by the user, the user can compare how the player A runs in the respective games from a desired position and direction. Alternatively, the image processing system 10 may receive user-designation of the direction of the virtual viewpoint and may automatically determine the position of the virtual viewpoint in such a manner that the player A is included in a field of vision based on the virtual viewpoint. Further, the plurality of objects to be compared in the virtual viewpoint images may be different players, and even in this case, the details of the above-described processing remain the same.

[Adjustment of a Plurality of Objects Captured at Different Locations]

The case of generating the virtual viewpoint images containing the plurality of image capturing targets captured at different image capturing time points at the same image capturing location is described above. A case of generating a virtual viewpoint image containing a plurality of image capturing targets captured at different image capturing locations will be described below.

Figure 10:
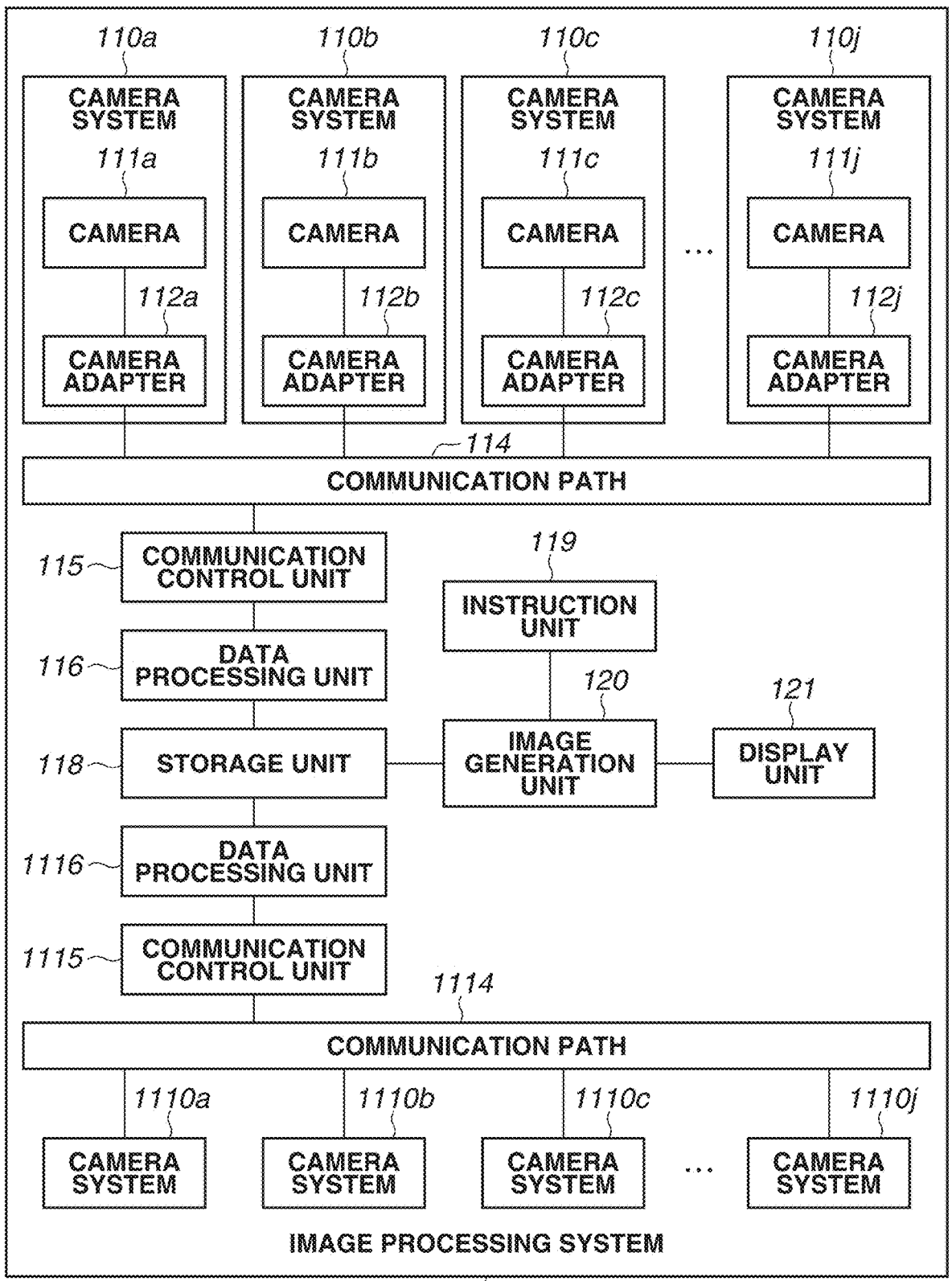
FIG. 10 is a diagram illustrating an example of a configuration of an image processing system.

FIG. 10 illustrates an example of a configuration of an image processing system 20. The image processing system 20 includes ten sets of camera systems 1110 from a camera system 1110a to a camera system 1110j, a communication path 1114, a communication control unit 1115, and a data processing unit 1116, in addition to the above-described configuration of the image processing system 10. The camera systems 1110, the communication control unit 1115, and the data processing unit 1116 respectively have functions similar to those of the camera systems 110, the communication control unit 115, and the data processing unit 116. The configurations of the apparatuses do not have to match and, for example, cameras of the camera systems 1110 and the cameras 111 of the camera systems 110 may be different in image capturing parameters such as an angle of view and a frame rate. Further, the number of the camera systems 1110 of the image processing system 20 is not limited to that in the example illustrated in FIG. 10, and the number of the camera systems 110 may be different from the number of the camera systems 1110.

The camera systems 1110 and 110 are disposed at different image capturing locations (e.g., different athletic fields). The storage unit 118 stores data that is based on the image capturing and is acquired by the camera systems 1110, and data that is based on the image capturing and is acquired by the camera systems 110. For example, the data is stored in the storage unit 118 together with the identification information that specifies the name and venue the image capturing target competition and is identifiable by the image generation unit 120. The image generation unit 120 generates a virtual viewpoint image that contains an image of a plurality of objects captured at a plurality of different image capturing locations and is based on the virtual viewpoint specified by the viewpoint information using the data stored in the storage unit 118.

Figure 5B:
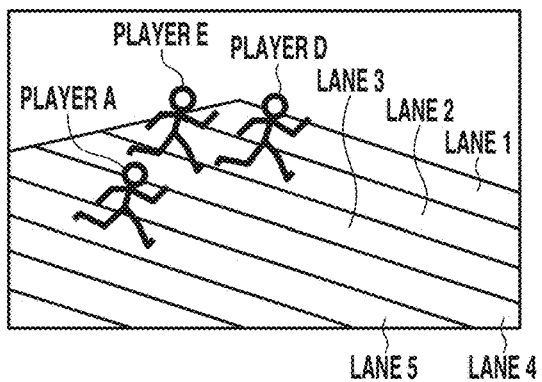
Figure 5C:
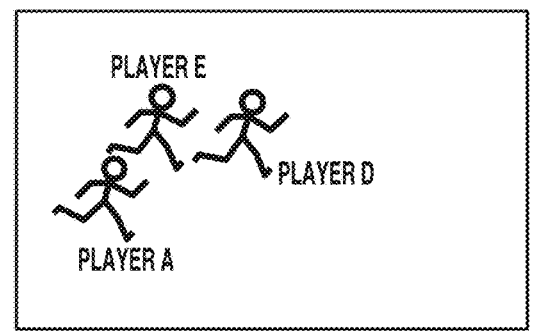
Figure 5D:
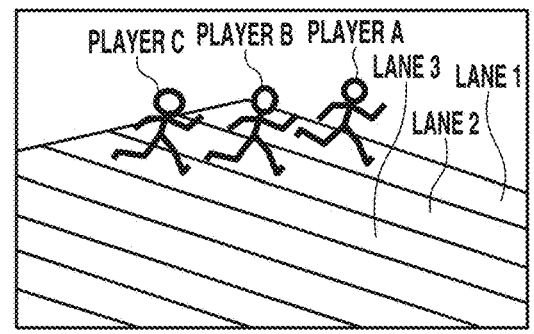
Figure 5E:
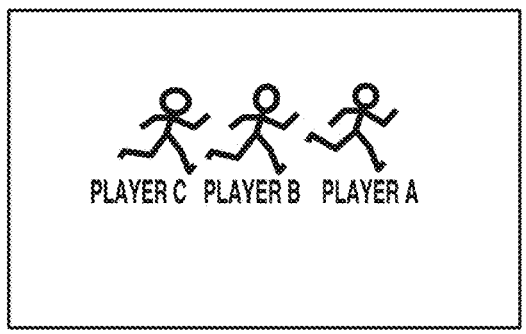
Figure 5F:
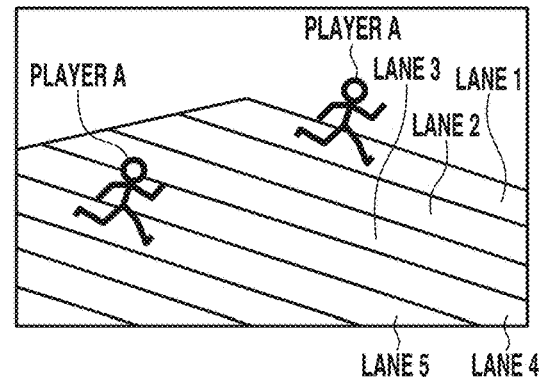
Figure 5G:
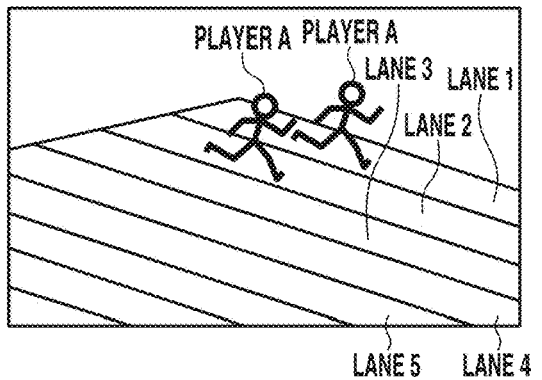
Figure 6:
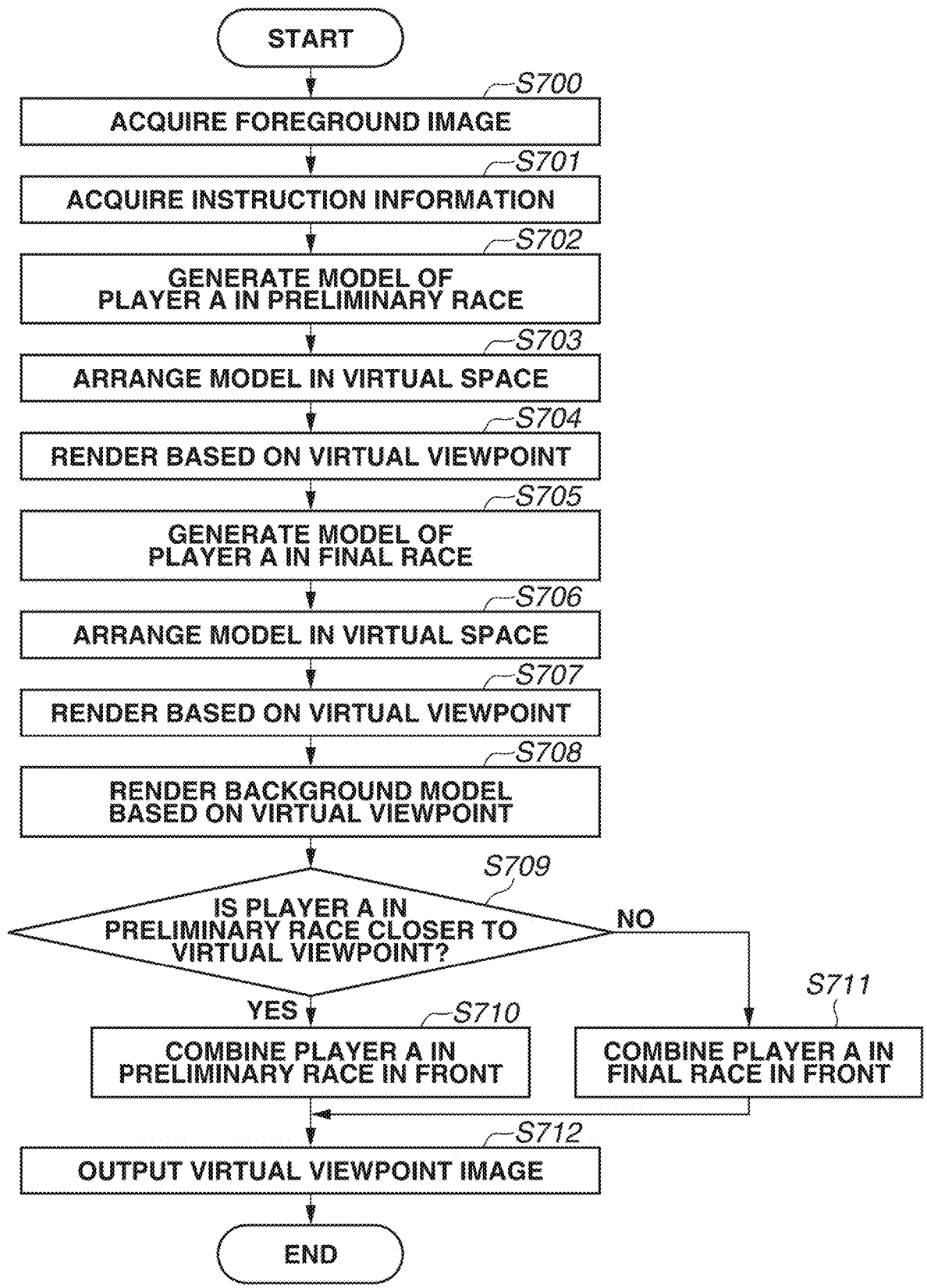
FIG. 6 is a flowchart illustrating an example of an operation of the image generation unit.

For example, the players A, D, and E participate in a first race held in a first athletic field where the camera systems 110 are disposed as illustrated in FIG. 5B. Further, the players A, B, and C participate in a second race held on a different day in a second athletic field where the camera systems 1110 are disposed as illustrated in FIG. 5D. In this case, if the player A in the first race and the player A in the second race are selected as an object to be displayed in a virtual viewpoint image by a user operation via the instruction unit 119, the image generation unit 120 generates a virtual viewpoint image as illustrated in FIG. 5F or 5G.

An image of a background object such as the 100-meter lanes in the virtual viewpoint image may be generated based on an image captured at the first athletic field or an image captured at the second athletic field. Further, an image of a background object may be generated by combining an image of the first athletic field and an image of the second athletic field or may be generated by computer graphics without using captured images. A virtual viewpoint image containing no background object may be generated. A plurality of objects to be displayed in a virtual viewpoint image does not have to be the same person and, for example, a virtual viewpoint image containing the player A in the first race and the player B in the second race may be generated. The players are not limited to those captured on different days and time points, and a virtual viewpoint image containing a plurality of players captured at different locations and at the same time point may be generated.

A difference between an operation sequence of the image processing system 20 and the operation sequence of the image processing system 10 will be described below with reference to FIG. 4. In the image processing system 10, the same camera group of the plurality of camera systems 110 captures a plurality of races in step S502, and data that is based on the image capturing of the plurality of races is transmitted from the camera systems 110 to the image generation unit 120 in step S504. Meanwhile, in the image processing system 20, the camera systems 110 and the camera systems 1110 each perform steps S501 to S504. Specifically, the camera group of the plurality of camera systems 110 and the camera group of the plurality of camera systems 1110 capture a plurality of races in a plurality of image capturing situations that are different from each other in an image capturing location. Then, the image generation unit 120 acquires, from the camera systems 110, the data based on the image capturing from the plurality of directions in one of the image capturing situations and acquires, from the camera systems 1110, the data based on the image capturing from the plurality of directions in another one of the image capturing situations. In the image processing system 20, the number of races to be captured by each camera system in step S502 may be one. The other operations of the image processing system 20 are similar to those of the image processing system 10.

The first athletic field in which the camera systems 110 are disposed and the second athletic field in which the camera systems 1110 are disposed may be different in shape. Therefore, the arrangements of the camera systems 110 and 1110 may not be always the same. Thus, the coordinate information contained in the three-dimensional shape data about the player A in the first race that is generated based on the image capturing performed by the camera systems 110 and the coordinate information contained in the three-dimensional shape data about the player A in the second race that is generated based on the image capturing performed by the camera systems 1110 cannot be processed uniformly. For example, the coordinate information about an object located at a finish line of the first lane in the first athletic field does not always match the coordinate information about an object located at a finish line of the first lane in the second athletic field.

If a virtual viewpoint image is generated by uniformly processing the coordinate information, for example, the player A may be displayed at a position outside the 100-meter lane in the virtual viewpoint image or may be displayed as though the player A is running in a direction that is different from the 100-meter lane. Further, the display sizes of the player A in the first race and the player A in the second race may become unnaturally different. In order to solve the above-described issues, the image generation unit 120 may adjust the positions, orientations, and sizes of the objects using adjustment information input based on a user operation via the instruction unit 119. However, this method is inconvenient to the user.

Thus, the image processing system 20 stores position information about the image capturing target objects and information about a reference position and a reference direction in the image capturing locations in the storage unit 118. Then, the image generation unit 120 generates a virtual viewpoint image based on the data acquired from the storage unit 118, whereby generation of an unnatural virtual viewpoint image is prevented.

Specifically, the data processing unit 116 stores data such as the foreground images based on the image capturing performed by the camera systems 110 together with the position information, which specifies the position of the foreground object, in the storage unit 118. The data processing unit 116 further stores information that specifies a predetermined reference position in the first athletic field (e.g., a center 200a, a start position 204a, and a finish position 1204a in an athletic field illustrated in FIG. 11A) in the storage unit 118. The data processing unit 116 further stores information that specifies the reference direction, such as a direction parallel to the 100-meter lanes, in the storage unit 118. The information that specifies the object position, the information that specifies the reference position, and the information that specifies the reference direction are all specified by coordinate values on the same coordinate system. The reference position and the reference direction are not limited to those described above. Information that specifies two reference positions may be used as information that specifies a reference direction connecting the reference positions. Similarly, information that specifies the lane width of the 100-meter lanes may also be stored in the storage unit 118.

Similarly, the data processing unit 1116 stores data such as the foreground images based on the image capturing performed by the camera systems 1110 together with the position information, which specifies the position of the foreground object, in the storage unit 118. The data processing unit 1116 also stores information that specifies a predetermined reference position in the second athletic field (e.g., a center 200x, a start position 204x, and a finish position 1204x in an athletic field illustrated in FIG. 11B) in the storage unit 118. The data processing unit 1116 also stores information that specifies the reference direction, such as a direction parallel to the 100-meter lanes, in the storage unit 118. The information that specifies the reference position and the information that specifies the reference direction are input by a user operation via the data processing unit 116. At least one of the pieces of information described above may be input from a different apparatus, or the data processing unit 116 may acquire the information by analyzing the images based on the image capturing performed by the cameras 111. While the information that specifies the position of the foreground object is acquired based on the images captured by the plurality of camera systems 1110, the acquisition is not limited to that described above, and the information may be acquired by, for example, attaching a position sensor to a foreground object such as a player.

Since the various types of information described above are stored in the storage unit 118, the image generation unit 120 can arrange the foreground models generated based on the data acquired from the storage unit 118 in a virtual space as appropriate. Specifically, the image generation unit 120 can determine a relative position to the reference position, such as the start position or the finish position, and a relative orientation to the reference direction as the position and orientation of each object corresponding to the foreground models at the time of image capturing. Then, the image generation unit 120 corrects the coordinate information about the three-dimensional shape data about the foreground objects based on the relative position and the relative orientation. Specifically, the image generation unit 120 determines the position of the player A in the first race in the virtual viewpoint image based on the relationship between the reference position and the position of the player A in the first athletic field. Further, the image generation unit 120 determines the position of the player A in the second race in the virtual viewpoint image based on the relationship between the reference position and the position of the player A in the second athletic field. In this way, deviations in the positions, orientations, and sizes of the objects are reduced even in the cases in which the models of the plurality of objects captured at different image capturing locations are arranged in the same virtual space.

For example, the image generation unit 120 arranges, at a position corresponding to a position that is 10 meters ahead of the reference position in the reference direction in a virtual space, the model of the player A running 10 meters ahead of the start line two seconds after the start of the first race in the first athletic field. Further, the image generation unit 120 arranges, at a position corresponding to a position that is 12 meters ahead of the reference position in the reference direction in a virtual space, the model of the player A running 12 meters ahead of the start line two seconds after the start of the second race in the second athletic field. Then, the models arranged in a virtual space are rendered to generate a virtual viewpoint image in which the player A in the first race and the player A in the second race are running next to each other in the same direction. The lane corresponding to the position at which each model is to be arranged in a virtual space is also determined based on the coordinate information corrected based on the reference position. The arrangement is not limited to that described above and, for example, the coordinate information may be changed further in such a manner that a plurality of models is arranged in adjacent lanes.

In the modification and rendering of the position information (coordinate information) about the three-dimensional shape data about the object, all the position information about the data about the respective races may be modified, or one of the position information about the data of the respective races may be modified. For example, the position information about the player A in the first race and the position information about the player A in the second race may both be modified in such a manner that the model of the player A in the first race and the model of the player A in the second race are arranged as appropriate in a virtual space. For another example, the position information about the player A in the second race may be modified based on the position information about the player A in the first race in such a manner that the model of the player A in the second race is arranged as appropriate in a virtual space where the model of the player A in the first race is arranged.

The virtual viewpoint image is generated by the above-described method so that even in the case of generating the virtual viewpoint image containing the plurality of objects captured at different image capturing locations, the user does not have to manually adjust the positions of the objects. Thus, the user can compare how the player A runs in the first race in the first athletic field and how the player A runs in the second race in the second athletic field in a single still or moving image with ease. Further, since the coordinate information about each point forming the model of the object is corrected based on the relative position from the reference position, the player A in the first race and the player A in the second race in the virtual viewpoint image are prevented from becoming unnaturally different in size. The plurality of objects to be compared in the virtual viewpoint image may be different players, and even in this case, the above-described details of the processing remain the same.

While the case of adjusting the positions of the plurality of objects by correcting the coordinate information contained in the three-dimensional shape data about the objects is described above, the position adjustment method is not limited to that described above and, for example, the position adjustment is also realized by converting the viewpoint information. Specifically, the image generation unit 120 converts the viewpoint information that specifies the position and orientation of the virtual viewpoint acquired from the instruction unit 119 based on the information that specifies the reference position and the reference direction of the image capturing location stored in the storage unit 118.

Figure 11A:
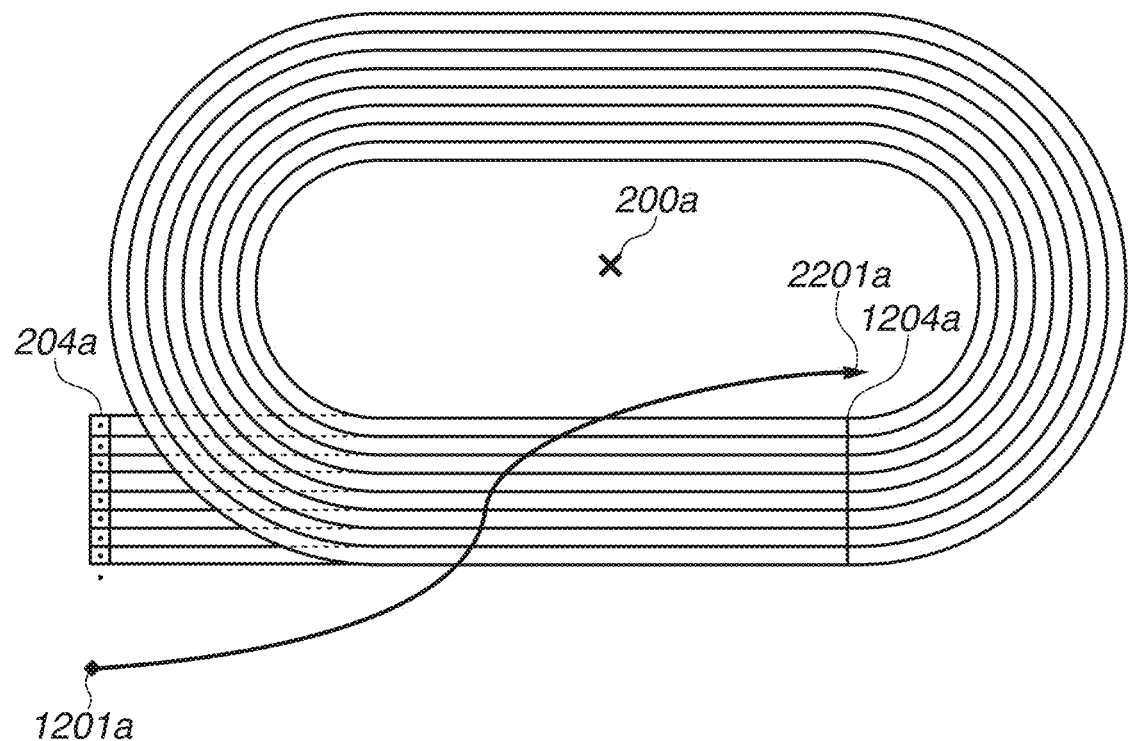
FIGS. 11A and 11B are diagrams each illustrating an example of a plurality of different image capturing locations.
Figure 11B:
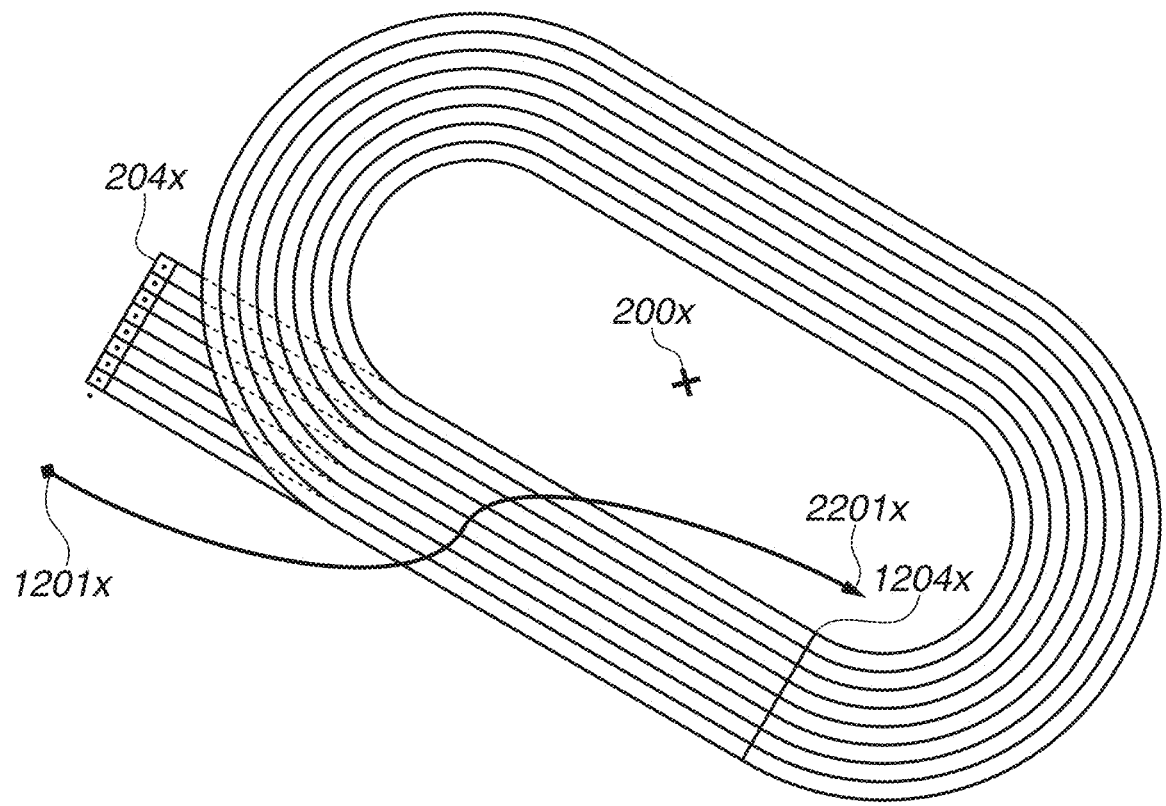

For example, in a case in which the viewpoint information input from the instruction unit 119 to the image generation unit 120 specifies a virtual viewpoint that moves from a position 1201a to a position 2201a on the coordinate system corresponding to the first athletic field in FIG. 11A, the image generation unit 120 converts the coordinate information that specifies the position of the virtual viewpoint contained in the viewpoint information to information that specifies a relative position from the start position 204a which is the reference position. Then, the image generation unit 120 generates, based on the information that specifies the relative position and the start position 204x in the second athletic field in FIG. 11B, viewpoint information that specifies a virtual viewpoint that moves from a position 1201x to a position 2201x on the coordinate system corresponding to the second athletic field. Similarly, the image generation unit 120 also converts the orientation of the virtual viewpoint based on the reference direction in the first athletic field and the reference direction in the second athletic field.

Then, the image generation unit 120 renders the foreground model generated from the data that is based on the image capturing in the first athletic field based on the unconverted viewpoint information (the viewpoint information that specifies the virtual viewpoint from the position 1201a to the position 2201a). The image generation unit 120 further renders the foreground model generated from the data that is based on the image capturing in the second athletic field, based on the converted viewpoint information (the viewpoint information that specifies the virtual viewpoint from the position 1201x to the position 120x). Then, the image generation unit 120 combines the rendering results to generate a virtual viewpoint image containing an image representing the foreground object captured in the first athletic field and an image representing the foreground object captured in the second athletic field.

As described above, the viewpoint information is converted based on the information that specifies the reference position and the information that specifies the reference direction in the image capturing location so that the position adjustment of the plurality of objects in the virtual viewpoint image is realized similarly to the above-described method for correcting the coordinate information about the objects. With the method in which the viewpoint information is converted, the processing of correcting the coordinate information about the large number of points forming the model of the object becomes unnecessary, so that the processing load of the image generation unit 120 is reduced. While the case of converting the viewpoint information corresponding to the first athletic field to the viewpoint information corresponding to the second athletic field is described above as an example, the method is not limited to that described above, and the viewpoint information corresponding to the virtual space may be converted to first viewpoint information corresponding to the first athletic field and second viewpoint information corresponding to the second athletic field.

[Example of Data Format]

An example of a format of data used in the image processing systems 10 and 20, especially the data stored in the storage unit 118, will be described below. In the description below, the data stored in the storage unit 118 includes the foreground images and the foreground model as data that is based on the image capturing by the plurality of cameras 111, the background images and the background model, and the additional information about the data. Specifically, the camera adapters 112 generate the foreground images and the background images based on the images captured by the cameras 111. Then, the data processing unit 116 generates the foreground model and the background model based on the plurality of foreground images and background images generated by the plurality of camera adapters 112. Then, the data processing unit 116 stores the plurality of foreground images and background images acquired from the plurality of camera adapters 112 and the generated foreground model and the generated background model together with various types of additional information in the storage unit 118.

The additional information stored in the storage unit 118 includes at least one of the image capturing time point information, the predetermined event occurrence time point information, and the information about the reference position and the reference direction in the image capturing location. For example, information that specifies a track position, lane position, start position, finish position, lane width, competition start time point, race start time point, and race finish time point is stored as unique information about the competition. The information may be input by a user operating the data processing unit 116 or may be input from the Global Positioning System (GPS), a radio clock, or an automatic measurement device. The additional information stored in the storage unit 118 is not limited to those described above and may be, for example, information about the name of the image capturing location, the position of the image capturing location, the name of the image capturing target competition or performance, and the image capturing target competition event.

In the description below, the data that is based on the image capturing such as the foreground images and the three-dimensional shape data and the additional information are stored together in a specific format in the same file in the storage unit 118. Specifically, the International Organization for Standardization (ISO)/International Electrotechnical Commission (IEC) 14496-12 (Moving Picture Experts Group (MPEG)-4 Part 12) ISO base media file format (hereinafter, referred to as "ISO BMFF") standards will be described as an example below. FIGS. 12A to 12D illustrate an example of a configuration of an ISO BMFF data file in the present exemplary embodiment.

Figure 12A:
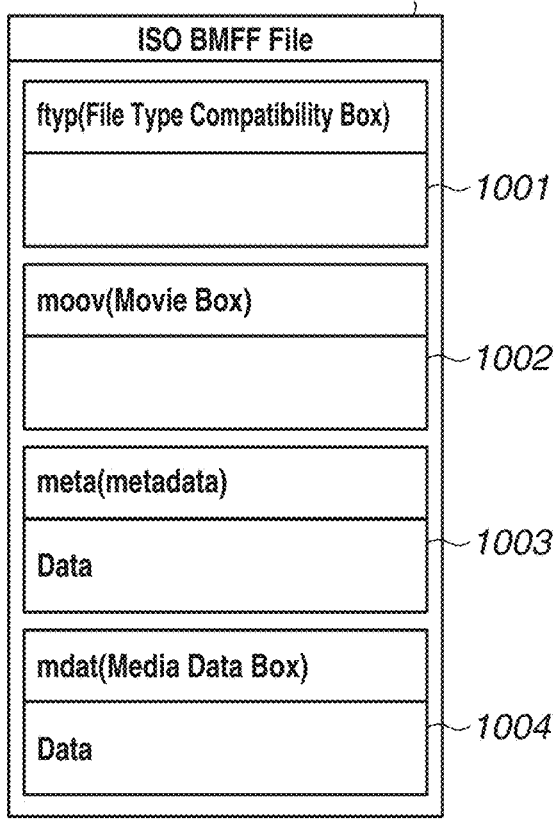
FIGS. 12A to 12D are diagrams each illustrating an example of a data format that is processed by the image processing system.

In FIG. 12A, a file 1000 includes four boxes that are a ftyp (File Type Compatibility Box) 1001, a moov (Movie Box) 1002, a meta (metadata) 1003, and a mdat (Media Data Box) 1004. The ftyp 1001 contains file format information, such as information that specifies that the file is an ISO BMFF file, information about the box version, and information about the name of the manufacturer of the image file. The moov 1002 contains information such as a time axis and address for managing medium data. The mdat 1004 stores the background images, the foreground images captured by the respective cameras at respective time points, and the three-dimensional shape data. The configuration of the meta 1003 in which metainformation containing the additional information is stored is expressed, for example, as follows.

```
aligned(8) class Metabox (handler_type)extends FullBox('meta',
version = 0, 0){
HandlerBox(handler_type) theHandler;
PrimaryItemBox primary_resource; // optional
DataInformationBox file_locations; // optional
ItemLocationBox item_locations; // optional
ItemProtectionBox protections; // optional
ItemInfoBox item_infos; // optional
IPMPControlBox IPMP_control; // optional
ItemReferenceBox item_refs; // optional
ItemDataBox item_data; // optional
Synthesizing_scene_location_information; // optional
Synthesizing_scene_time_information; // optional
Synthesizing_scene_virtual_camera_information; // optional
Synthesizing_scene_object_information; // optional
}
```

In the above-described configuration, "Synthesizing_scene_location_information" specifies the position information for use in the combining of the images of the plurality of objects. "Synthesizing_scene_time_information" specifies the time point information for use in the combining. "Synthesizing_scene_location_informationbox" which specifies the position information for use in the combining is expressed as follows.

Box Type: 'ssli'
Container: Meta box ('meta')
Mandatory: No
Quantity: Zero or one The syntax is expressed as follows.

```
aligned(8) class ItemLocationBox extends FullBox('ssli',version,0) {
unsigned int(32) offset_size;
unsigned int(32) length_size;
unsigned int(32) base_offset_size;
if (version == 1)
unsigned int(32) index_size;
else
unsigned int(32) reserved;
unsigned int(64) capture_date_time_code;
unsigned int(16) num_char_place_name;
for (i=0; i<num_char_place_name;i++)
unsigned char(8) place_name[i];
signed int (32)location_latitude;
signed int (32)location_longitude;
unsigned int(16) num_char_convention_name;
for (i=0; i<num_char_convention_name;i++)
unsigned char(8) convention_name[i];
unsigned int(32) category_code;
if ((category_code > 0x00010000)&& (category_code <
0x0001FFFF)){for (i=0; i<3;i++)
signed int(32)location_start_0th lane[i];
for (i=0; i<3;i++)
signed int(32)location_end_0th lane[i];
unsigned int(8)num_lane;
unsigned int(8)lane_width;
}
else if (category_code == 0x00020000){
for (i=0; i<3;i++)
signed int(32)location_start_point[i];
for (i=0; i<3;i++)
signed int(32)location_jump_point[i];
}else if {
...
}
}
```

In the above-described syntax, "offset_size", "length_size", "base_offset_size", "index_size", and "reserved" relate to the box size. "capture_date_time_code" specifies the date and time relating to the image capturing such as an image capturing start time point using, for example, a time difference (hour, minute) between a World Wide Web Consortium (W3C)-Date and Time Formats (DTF) format (Christian year, month, date, hour, minute, second, millisecond) and the Coordinated Universal Time (UTC). The above-described information is integrated as a bit string with an extra bit added.

"num_char_place_name" specifies the length of a character string that specifies the image capturing location. "place_name" specifies the name of the image capturing location and is, for example, a character string such as "Tokyo Soccer Stadium". This information, however, is not limited to a character string. A code that specifies a language may be added to the information. A unique number of the stadium that is the image capturing location may be provided. For example, in the character string "JPTKYST", the first two characters specify the country name ("JP" is Japan), the next three characters specify the city name ("TKY" is Tokyo), and the last two characters specify the athletic field ("ST" is Tokyo Stadium).

"location_latitude" specifies the latitude of the origin of the athletic field. For example, the first bit of 32 bits specifies the north or south latitude, and the remaining 31 bits specify an angle obtained by equally dividing 90 degrees. "location_longitude" specifies the longitude of the origin of the athletic field. For example, the first bit of 32 bits specifies the east or west longitude, and the remaining 31 bits specify an angle obtained by equally dividing 180 degrees.

"num_char_convention_name" specifies the length of a character string that specifies an outline of the image capturing, i.e., the name of the competition or performance "convention_name" specifies the name of the image capturing event and is, for example, the character string "XXth Olympic". This information, however, is not limited to a character string. A code that specifies a language may be added to the information.

"category_code" specifies the competition event. For example, the high-order two bytes that are 0x0001 specify a track competition, and the remaining two bytes specify the distance. As another example, the high-order two bytes that are 0x0002 specify a jumping competition (e.g., long jump, triple jump, pole vault, high jump) and that are 0x0000 specify a long jump. The information is not limited to those described above, and the competition event may be specified using a character string.

The below-described information specifies unique information about the competition. In a case in which the high-order two bytes of "category_code" specify a track competition, "location_start_0th lane" specifies the start position of the lane of the smallest number using the coordinates (x, y, z) of the relative position from the origin of the athletic field. Further, "location_end_0th lane" specifies the finish position of the lane of the smallest number using the coordinates (x, y, z) of the relative position from the origin of the athletic field. "num_lane" specifies the number of lanes. "lane_width" specifies the lane width in centimeters.

In a case in which the high-order two bytes of "category_code" specify a long jump, "location_start_point" specifies the position from which the player starts running using the coordinates (x, y, z) of the relative position from the origin of the athletic field. Further, "location_jump_point" specifies the position of the jump point using the coordinates (x, y, z) of the relative position from the origin of the athletic field.

The competition event and the unique information about the competition are not limited to those described above. For example, in a case of a shot put, hammer throw, and javelin throw, information about the position of a circle where a player performs throwing, a throwing direction, and a point of fall may be specified using a direction from the center of the circle. Further, the image capturing target is not limited to sports, and in a case in which the image capturing target is, for example, a concert, the center position of the stage may be specified.

"Synthesizing_scene_time_informationbox" which specifies time point information for use in the combining is expressed as follows.

Box Type: 'ssti'
Container: Meta box ('meta')
Mandatory: No
Quantity: Zero or one The syntax is expressed as follows.

```
aligned(8) class ItemLocationBox extends FullBox('ssti',version,0) {
unsigned int(32) offset_size;
unsigned int(32) length_size;
unsigned int(32) base_offset_size;
if (version == 1)
unsigned int(32) index_size;
else
unsigned int(32) reserved;
unsigned int(32) num_event;
if ((category_code > 0x00010000)&& (category_code <
0x0001FFFF)){for (i=0; i<num_event; i++){
unsigned int(32)event_start_time[i];
unsigned int(32)event_finish_time[i];
}
}else if (category_code == 0x00020000){
for (i=0; i<num_event; i++){
unsigned int(32)event_start_time[i];
unsigned int(32)event_jump_time[i];
}
}
}
```

"num_event" specifies the number of events that occur during a sequence of the competition, and examples thereof include the number of races in a 100-meter dash. The competition event is identified by "category_code" described above. For example, in a case of a track competition, the start time point of each of the first to (num_event)th races is specified by "event_start_time", and the time point at which the front player finishes is specified by "event_finish_time". The time points specified by the above-described codes may be specified by a relative time from the time point specified by "capture_date_time_code" described above or may each be specified in W3C-DTF format. Further, the finish time point may be specified by a relative time from the start time point. For example, in a case of a competition, a start time point may be detected in connection with the sound of a start pistol or a trigger of the start pistol. Further, in a case of a long jump, the start time point of each of the first to (num_event)th jumps is specified by "event_start_time", and the time point of each jump is specified by "event_jump_time". In this way, the information for use in the combining is contained as metainformation in the image data file.

Next, "Synthesizing_scene_virtual_camera_information" specifies information about the virtual camera that is involved in the generation of a virtual viewpoint image. "Synthesizing_scene_object_information" specifies subject information for use in the combining. The "Synthesizing_scene_virtual_camera_information" box which specifies the virtual camera information for use in the combining exists in units of frames, and the content thereof is expressed as follows.
Box Type: 'svci'
Container: Meta box ('meta')
Mandatory: No
Quantity: Zero or one
The syntax is expressed as follows.

```
aligned(8) class ItemLocationBox extends FullBox('svci',version,0) {
unsigned int(32) offset_size;
unsigned int(32) length_size;
unsigned int(32) base_offset_size;
if (version == 1)
unsigned int(32) index_size;
else
unsigned int(32) reserved;
```

```
for (i=0; i<3;i++)
unsigned int(32)virtual_camera_location[i];
for (i=0, i<4; i++)
int(32) rotation _quaternion[i];
float(32) horizontal_angle;
}
```

"virtual_camera_location" specifies the position of the virtual camera using the coordinates (x, y, z) of the relative position from the origin of the athletic field. "rotetion_quaternion" specifies the orientation of the camera using a quaternion, and the values of the real and imaginary parts are each described using a four-byte signed integer. "horizontal_angle" is an angle-of-view parameter and specifies an angle from a horizontal line using a four-byte signed floating-point number.

The "Synthesizing_scene_object_information" box which specifies the subject information for use in the combining is expressed as follows.
Box Type: 'ssoi'
Container: Meta box ('meta')
Mandatory: No
Quantity: Zero or one
The syntax is expressed as follows.

```
aligned(8) class ItemLocationBox extends FullBox('ssoi',version,0) {
unsigned int(32) offset_size;
unsigned int(32) length_size;
unsigned int(32) base_offset_size;
if (version == 1)
unsigned int(32) index_size;
else
unsigned int(32) reserved;
unsigned int(32) num_event;
for (i=0; i<num_event; i++){
unsigned int(32)num_object[i];
for (j=0; j<num_object; j++){
unsigned int(8)num_char_object_name[i][j];
for (k<num_char_object_name;k++)
unsigned char(8) object_name[i][j][k];
unsigned int(8) ID_number;
for (k=0; k<3; k++)
unsigned int(32)object_location[i][j][k];
}
}
}
```

"num_event" specifies the number of events that occur during a sequence of the competition, and examples thereof include the number of races in a 100-meter dash. "num_object" specifies the number of players (subjects) participating in the ith event. Further, "num_char_object_name" specifies the length of the name of the jth player participating in the ith event. "object_name" is a character string and specifies the name of the player. "ID_number" is an identification number of the player and specifies a participant number or bib number. "object_location" specifies the position of the player at the start time point using the coordinates (x, y, z) of the relative position from the origin of the athletic field.

Figure 12B:
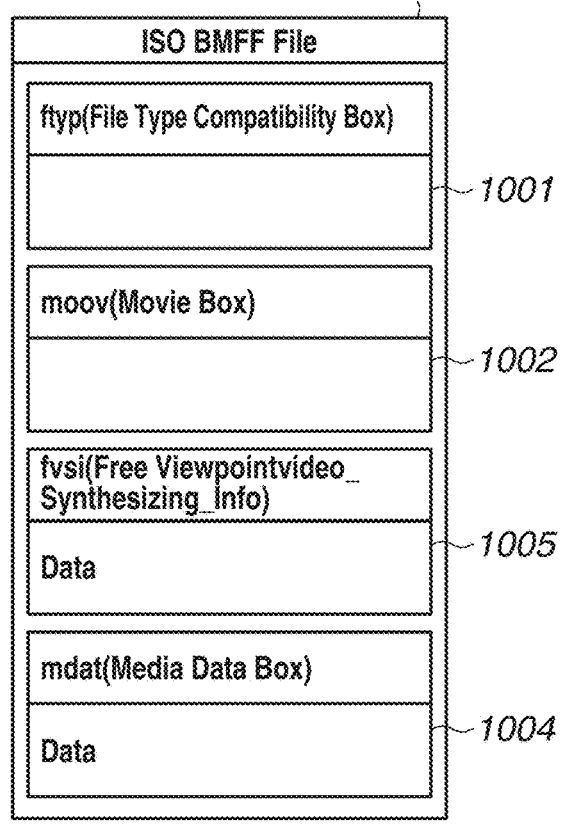
Figure 12C:
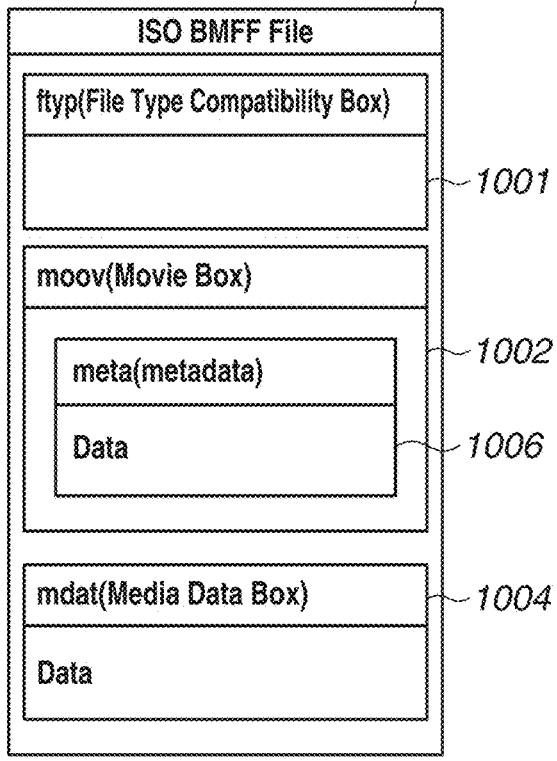
Figure 12D:
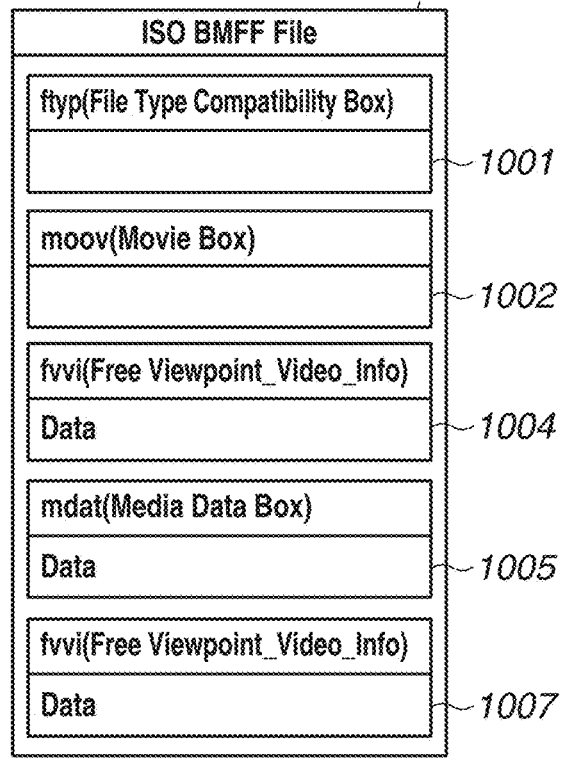

While the example of the file format illustrated in FIG. 12A is described above, the format of the data stored in the storage unit 118 is not limited to those described above. For example, as illustrated in FIG. 12B, a dedicated box may be provided in place of the meta 1003. In an example illustrated in FIG. 12B, a new box type that is a fvsi (Free Viewpoint-video_Synthesizing_Info) 1005 is used as a dedicated box. The box may be provided in units of moving images (sequences), in units of image clips including a plurality of frames, or in units of frames. Further, for example, as illustrated in FIG. 12C, the moov 1002 may include a meta 1006 and the moov 1002 may contain the metainformation. Further, for example, as illustrated in FIG. 12D, the metainformation may be stored in a plurality of boxes such as a fvvi (Free Viewpoint_Video_Info) 1004 and a fvvi 1007.

Next, the generation of a virtual viewpoint image using the above-described data will be described below. A search for data for use in the generation of a virtual viewpoint image is performed using the metainformation. For example, the user inputs a requirement of image data for use in the generation of a virtual viewpoint image using the instruction unit 119. For example, the name of the athletic field, the date and time of the competition, and the competition event are input. The image generation unit 120 reads the metainformation from the image data files stored in the storage unit 118 and extracts an image data file that matches the input information. In a case in which a plurality of pieces of image data matches the input information, the image generation unit 120, for example, notifies the instruction unit 119 of the extracted candidates or displays the candidates on the display unit 121 to prompt the user to select the image data to be used. Then, if information such as the position, orientation, direction, and angle of view of the virtual camera is input via the instruction unit 119, the image generation unit 120 generates a virtual viewpoint image using the extracted data and outputs the generated virtual viewpoint image to the display unit 121 to display the virtual viewpoint image on the display unit 121.

A further detailed description will be given below by describing a case of generating a virtual viewpoint image by combining an image of a player C in an athletic field A and an image of a player X in an athletic field X as an example. While a case in which the players C and Z participate in the same competition event (e.g., 100-meter dash) will be described as an example below, images of a plurality of players participating in different competition events may be combined.

First, the image generation unit 120 selects an image data file that corresponds to the time and the athletic field that are input from the instruction unit 119. This selection is performed by referring to "capture_date_time_code" and "place_name" described above. The image data file of the competition in the athletic field A in which the player C participates will be referred to as "image data file D", and the image data file of the competition in the athletic field X in which the player Z participates will be referred to as "image data file E". Alternatively, the selection may be performed by referring to information such as "convention_name".

Next, the image generation unit 120 selects a target athletic field to be combined with a foreground object image. For example, the image generation unit 120 may combine an image of the player Z with an image of the athletic field A containing the player C or may combine the images of the players C and Z with an image of an athletic field that is neither the athletic field A nor the athletic field X. In the latter case, the image generation unit 120 acquires an image data file containing data about the athletic field to be combined in addition to the above-described image data file. Further, an image of an athletic field that is not real may be combined. In the present exemplary embodiment, an image is generated by combining the players C and Z with the athletic field A.

The image generation unit 120 acquires the image data file D, identifies the start position of the athletic field A based on "ocation_start_0th lane", and identifies the finish position based on "ocation_end_0th lane". Further, the image generation unit 120 acquires the image data file E, identifies the start position of the athletic field X based on "ocation_start_0th lane", and identifies the finish position based on "ocation_end_0th lane". In this way, the image generation unit 120 identifies the relative position of the player C corresponding to the image data file D from the origin of the athletic field A. Similarly, the image generation unit 120 identifies the relative position of the player Z corresponding to the image data file E from the origin of the athletic field X.

Using the identified relative positions, the image generation unit 120 arranges the players C and Z on the 100-meter lanes. Further, the positions of the players C and Z may be shifted by a multiple of the lane width specified by "lane_width" so that the players C and Z are arranged in desired lanes, e.g., the position of the player Z may be shifted to a lane next to the player C. Since the image generation unit 120 can identify a running direction based on the start and finish positions of the athletic fields A and X, the image generation unit 120 can combine the images in such a manner that the players Z and C run in the same direction. Further, the image generation unit 120 may perform similar processing on each frame after the start to generate a moving image in which two players are running next to each other.

While the case of combining the images of two players is described above, the combining is not limited to that described above. In a case of combining images of three or more players, the position of each player is determined also based on the start position and the lane width. The image generation unit 120 may extract "unsigned int(32)event_start_time[i]" data from each piece of image data in order to synchronize time points such as start time points in the respective competitions. The image generation unit 120 can synchronize the time points with ease by combining the images of two players based on the time codes corresponding to the data.

As described above, the image generation unit 120 according to the present exemplary embodiment acquires, from the storage unit 118, the data that is based on the image capturing from the plurality of directions in a first image capturing situation. Further, the image generation unit 120 acquires, from the storage unit 118, the data that is based on the image capturing from the plurality of directions in a second image capturing situation which is different from the first image capturing situation in at least one of an image capturing location and an image capturing time point. The image generation unit 120 acquires, from the instruction unit 119, the viewpoint information which specifies the position and direction of the virtual viewpoint. Then, the image generation unit 120 generates, based on the data acquired from the storage unit 118, a virtual viewpoint image containing an image of an object captured in the first image capturing situation and an image of an object captured in the second image capturing situation. The generated virtual viewpoint image is a virtual viewpoint image that is based on the viewpoint information acquired from the instruction unit 119.

In this way, the user viewing the virtual viewpoint image can compare with ease the plurality of image capturing targets that is different in at least one of the image capturing location and the image capturing time point. Especially, since the virtual viewpoint image is generated based on the position and direction of the virtual viewpoint determined by a user operation, the user can compare the plurality of image capturing targets from various viewpoints. Further, if the user designates one virtual viewpoint, the plurality of image capturing targets is displayed as viewed from the same virtual viewpoint, so that the user can compare the displayed targets and designate a virtual viewpoint with ease compared to the cases of displaying the plurality of image capturing targets as viewed from different viewpoints.

Since the image processing system 10 adds the various types of additional information described above to the data stored in the storage unit 118, a virtual viewpoint image containing images of a plurality of objects captured in different image capturing situations is generated with ease. Especially, since the data is stored in the predetermined format such as the above-described data format, the image generation unit 120 can uniformly use the data acquired by the plurality of different camera systems, so that the efficiency of the processing of generating a virtual viewpoint image is increased.

While the case in which the image capturing target is the track and field event is mainly described in the present exemplary embodiment, the image capturing target is not limited to those described above. For example, even in a case in which the image capturing target is a swimming competition, gymnastics competition, soccer, or figure skating, a virtual viewpoint image containing images of a plurality of objects captured in a plurality of image capturing situations is generated using a similar method. Further, the image capturing target is not limited to sports competitions and may be a concert or play.

With the above-described exemplary embodiment, a virtual viewpoint image is provided from which a plurality of image capturing targets that is different in at least one of an image capturing location and an image capturing time point can be compared with ease.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2018-220906, filed Nov. 27, 2018, which is hereby incorporated by reference herein in its entirety.

What is claimed is:

1. An image processing apparatus comprising:
   one or more processors functioning by executing instructions stored in one or more memories as the following units:
   a first data acquisition unit configured to acquire data related to a first object captured from a plurality of directions;
   a second data acquisition unit configured to acquire data related to a second object captured from a plurality of directions, wherein the first object and the second object are different in a captured position;
   an information acquisition unit configured to acquire changing information for changing position information corresponding to the captured position about at least one of the first object and the second object;
   a viewpoint acquisition unit configured to acquire viewpoint information for specifying a position of a virtual viewpoint and a direction of view from the virtual viewpoint; and
   a generation unit configured to generate a virtual viewpoint image that corresponds to the viewpoint information acquired by the viewpoint acquisition unit and includes the first object and the second object, based on the data acquired by the first data acquisition unit, the data acquired by the second data acquisition unit, and the changing information acquired by the information acquisition unit.

2. The image processing apparatus according to claim 1, wherein the data acquired by the first data acquisition unit includes at least one of three-dimensional shape data about the first object and an image of the first object extracted from a captured image, and
   wherein the data acquired by the second data acquisition unit includes at least one of three-dimensional shape data about the second object and an image of the second object extracted from a captured image.

3. The image processing apparatus according to claim 1, wherein the first object and the second object are different in a captured time.

4. The image processing apparatus according to claim 3, wherein the first data acquisition unit further acquires information about the captured time of the first object and information about a time point at which a first event occurs, and
   wherein the second data acquisition unit further acquires information about the captured time of the second object and information about a time point at which a second event occurs, and
   wherein the generation unit generates the virtual viewpoint image based on the information acquired by the first data acquisition unit and the information acquired by the second data acquisition unit.

5. The image processing apparatus according to claim 4, wherein the generation unit generates the virtual viewpoint image corresponding to a single time point using the data that is acquired by the first data acquisition unit and corresponds to an image capturing time point that is later by a specific time length than the time point at which the first event occurs and the data that is acquired by the second data acquisition unit and corresponds to an image capturing time point that is later by the specific time length than the time point at which the second event occurs.

6. The image processing apparatus according to claim 4, wherein the generation unit generates the virtual viewpoint image corresponding to a period of a specific length using the data that is acquired by the first data acquisition unit and is based on image capturing performed during the period of the specific length from the time point at which the first event occurs and the data that is acquired by the second data acquisition unit and is based on image capturing performed during the period of the specific length from the time point at which the second event occurs.

7. The image processing apparatus according to claim 4, wherein the time point at which the first event occurs is a start time point of one of a plurality of competitions, and the time point at which the second event occurs is a start time point of another one of the plurality of competitions.

8. The image processing apparatus according to claim 1,
wherein the data acquired by the first data acquisition unit includes information for specifying the captured position of the first object,
wherein the data acquired by the second data acquisition unit includes information for specifying the captured position of the second object,
wherein the information acquisition unit acquires the changing information for changing, as the position information, at least one of the information for specifying the captured position of the first object and the information for specifying the captured position of the second object, and
wherein the generation unit generates the virtual viewpoint image based on the data acquired by the first data acquisition unit, the data acquired by the second data acquisition unit, and the changing information.

9. The image processing apparatus according to claim 8,
wherein the first data acquisition unit further acquires information about at least one of a reference direction and a reference position related to the captured position of the first object, and
wherein the second data acquisition unit further acquires information about at least one of a reference direction and a reference position related to the captured position of the second object.

10. The image processing apparatus according to claim 9, wherein the generation unit determines a position of an image of the first object in the virtual viewpoint image based on a relationship between the reference position related to the captured position of the first object and the captured position of the first object, and the generation unit determines a position of an image of the second object in the virtual viewpoint image based on a relationship between the reference position related to the captured position of the second object and the captured position of the second object.

11. The image processing apparatus according to claim 1,
wherein the information acquisition unit acquires the changing information for changing, as the position information, at least one of the position of the virtual viewpoint and the direction of view from the virtual viewpoint specified by the viewpoint information based on the captured position of the first object and the captured position of the second position, and
wherein the generation unit generates the virtual viewpoint image based on the viewpoint information changed by the changing information, the data acquired by the first data acquisition unit, and the data acquired by the second data acquisition unit.

12. The image processing apparatus according to claim 1, wherein the generation unit generates the virtual viewpoint image by arranging and rendering a three-dimensional model of the first object and a three-dimensional model of the second object in a same virtual space based on the changing information acquired by the information acquisition unit.

13. The image processing apparatus according to claim 12, wherein the generation unit arranges the three-dimensional model of the first object at a position in the virtual space that corresponds to the captured position of the first object, and the generation unit arranges the three-dimensional model of the second object at a position that is separated by a predetermined amount from a position in the virtual space that corresponds to the captured position of the second object.

14. The image processing apparatus according to claim 12, wherein the generation unit arranges the three-dimensional model of the first object and the three-dimensional model of the second object in such a manner that the three-dimensional models do not overlap.

15. The image processing apparatus according to claim 1, wherein the virtual viewpoint image generated by the generation unit includes the image of the first object, the image of the second object, and an image of a background captured in at least one of an image capturing of the first object and an image capturing of the second object.

16. The image processing apparatus according to claim 1, wherein the first object and the second object are a same person.

17. The image processing apparatus according to claim 1, wherein the viewpoint information acquired by the viewpoint acquisition unit is determined based on a user operation.

18. The image processing apparatus according to claim 1, wherein the data acquired by the first data acquisition unit and the data acquired by the second data acquisition unit are data based on image capturing performed by a different image capturing apparatus group.

19. The image processing apparatus according to claim 1, wherein the data acquired by the first data acquisition unit and the data acquired by the second data acquisition unit are data based on image capturing performed by a same image capturing apparatus.

20. An image processing method comprising:
acquiring, as first data acquisition, data related to a first object captured from a plurality of directions;
acquiring, as second data acquisition, data related to a second object captured from a plurality of directions, wherein the first object and the second object are different in a captured position;
acquiring changing information for changing position information corresponding to the captured position about at least one of the first object and the second object;
acquiring viewpoint information for specifying a position of a virtual viewpoint and a direction of view from the virtual viewpoint; and
generating a virtual viewpoint image that corresponds to the acquired viewpoint information and includes the first object and the second object, based on the data acquired by the first data acquisition, the data acquired by the second data acquisition, and the changing information.

21. The image processing method according to claim 20, wherein the data acquired by the first data acquisition includes at least one of three-dimensional shape data about the first object and an image of the first object extracted from a captured image, and wherein the data acquired by the second data acquisition includes at least one of three-dimensional shape data about the second object and an image of the second object extracted from a captured image.

22. The image processing apparatus according to claim 20, wherein the generating generates the virtual viewpoint image by arranging and rendering a three-dimensional model of the first object and a three-dimensional model of the second object in a same virtual space based on the changing information.

23. A non-transitory computer-readable storage medium that stores a program for causing a computer to execute an image processing method comprising:

acquiring, as first data acquisition, data related to a first object captured from a plurality of directions;

acquiring, as second data acquisition, data related to a second object captured from a plurality of directions, wherein the first object and the second object are different in a captured position;

acquiring changing information for changing position information corresponding to the captured position about at least one of the first object and the second object;

acquiring viewpoint information for specifying a position of a virtual viewpoint and a direction of view from the virtual viewpoint; and generating a virtual viewpoint image that corresponds to the acquired viewpoint information and includes the first object and the second object, based on the data acquired by the first data acquisition, the data acquired by the second data acquisition, and the changing information.

* * * * *